(12) United States Patent
Jung

(10) Patent No.: US 11,209,887 B1
(45) Date of Patent: Dec. 28, 2021

(54) DYNAMIC ALLOCATION OF POWER FROM MULTIPLE SOURCES IN AN AUTONOMOUS MOBILE DEVICE

(71) Applicant: AMAZON TECHNOLOGIES, INC., Seattle, WA (US)

(72) Inventor: Hwisung Jung, Pleasanton, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 372 days.

(21) Appl. No.: 15/926,288

(22) Filed: Mar. 20, 2018

(51) Int. Cl.
| | |
|---|---|
| *G06F 1/3209* | (2019.01) |
| *H02J 7/00* | (2006.01) |
| *G05D 1/02* | (2020.01) |
| *B60L 58/10* | (2019.01) |
| *G06F 1/3212* | (2019.01) |

(52) U.S. Cl.
CPC .......... *G06F 1/3209* (2013.01); *H02J 7/0021* (2013.01); *B60L 58/10* (2019.02); *G05D 1/021* (2013.01); *G05D 2201/0211* (2013.01); *G06F 1/3212* (2013.01)

(58) Field of Classification Search
CPC ..... H02J 7/0018; H02J 7/0029; G06F 1/3209; G06F 1/3212
IPC .................. H02J 7/0018,7/0029; G06F 1/3209, 1/3212
See application file for complete search history.

(56) References Cited

U.S. PATENT DOCUMENTS

| | | | |
|---|---|---|---|
| 9,415,889 B2 * | 8/2016 | Albert | B65B 43/44 |
| 2014/0006807 A1 * | 1/2014 | Oglesby | G06F 1/263 |
| | | | 713/300 |
| 2017/0144553 A1 * | 5/2017 | Steele | B60L 58/22 |

* cited by examiner

*Primary Examiner* — Terrell S Johnson
(74) *Attorney, Agent, or Firm* — Lindauer Law, PLLC

(57) ABSTRACT

A robot operates using electrical power. An application subsystem provides application functionality such as processing speech, performing video calls, retrieving information responsive to a user request, presenting audio or video content, and so forth. A mobility subsystem includes sensors, software, and hardware that allows the robot to move about an environment. The application subsystem operates using electrical power from a first battery while the mobility subsystem operates using electrical power from a second battery. An electrical interconnect allows for the transfer of electrical power between the subsystems. A power management module uses information about previous tasks performed by the robot that involved the application subsystem and the mobility subsystem to develop power training data. This power training data is then used to estimate power consumption for future task requests. Based on available charge of the respective batteries, power may be transferred from the second battery to operate the application subsystem.

20 Claims, 13 Drawing Sheets

POWER TRAINING DATA 116

Robot: AM051800
Related users: KSA09, SCA16, TXK26

| CLASSIFICATION 402 || POWER CONSUMPTION (WH) 406 |||
|---|---|---|---|---|
| MOBILITY SPEED 404 | APPLICATION 132 | MOBILITY 408 | APPLICATION 410 | TOTAL POWER CONSUMPTION 412 |
| LOW | VIDEO CALL | 9 | 5 | 14 |
| LOW | MOVIE | 9 | 3 | 12 |
| MED | VIDEO CALL | 13 | 5 | 18 |
| MED | MOVIE | 13 | 3 | 16 |
| MED | SECURITY | 13 | 5 | 18 |
| HIGH | GAMES | 17 | 7 | 24 |

FIG. 4

FIRST TABLE
DUAL BATTERY
502

| CLASSIFICATION 402 | | POWER CONSUMPTION (WH) 406 | | EST. HOURS OF OPERATION 506 | | EFFECTIVE RUNTIME 512 |
|---|---|---|---|---|---|---|
| MOBILITY SPEED 404 | APPLICATION 132 | MOBILITY 408 | APPLICATION 410 | MOBILITY 508 | APPLICATION 510 | |
| LOW | VIDEO CALL | 9 | 5 | 6.4 | 3.4 | 3.4 |
| LOW | MOVIE | 9 | 3 | 6.4 | 5.6 | 5.6 |
| MED | VIDEO CALL | 13 | 5 | 4.4 | 3.4 | 3.4 |
| MED | MOVIE | 13 | 3 | 4.4 | 5.6 | 4.4 |

FIRST BATTERY CHARGE = 16.8 WH
SECOND BATTERY CHARGE = 57.6 WH

| AVERAGE RUNTIME 514 | 4.0 |
|---|---|

SECOND TABLE
DUAL BATTERY WITH
DYNAMIC
ALLOCATION
504

| CLASSIFICATION 402 | | EFFECTIVE AVAILABLE CHARGE INCLUDING TRANSFER (WH) 516 | | | EST. HOURS OF OPERATION 506 | | EFFECTIVE RUNTIME 512 |
|---|---|---|---|---|---|---|---|
| MOBILITY SPEED 404 | APPLICATION 132 | MOBILITY 518 | TXFER 520 | APPLICATION 522 | MOBILITY 508 | APPLICATION 510 | |
| LOW | VIDEO CALL | 50.4 | 7.2 | 18.7 | 5.6 | 5.6 | 5.6 |
| LOW | MOVIE | 53.3 | 4.3 | 17.9 | 5.9 | 6.0 | 5.9 |
| MED | VIDEO CALL | 49.0 | 8.6 | 19.1 | 3.8 | 3.8 | 3.8 |
| MED | MOVIE | 57.6 | 0 | 16.8 | 4.4 | 5.6 | 4.4 |

FIRST BATTERY CHARGE = 16.8 WH
SECOND BATTERY CHARGE = 57.6 WH

| AVERAGE RUNTIME 514 | 4.9 |
|---|---|

FIG. 5

DYNAMIC ALLOCATION OF POWER FROM MULTIPLE SOURCES IN AN AUTONOMOUS MOBILE DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4 illustrates power training data that associates particular types of mobility and application tasks with power consumption, according to some implementations.

FIG. 5 depicts tables of differences in runtime associated with a separate dual battery system as compared to the dynamic allocation system described herein, according to some implementations.

Figure 1:
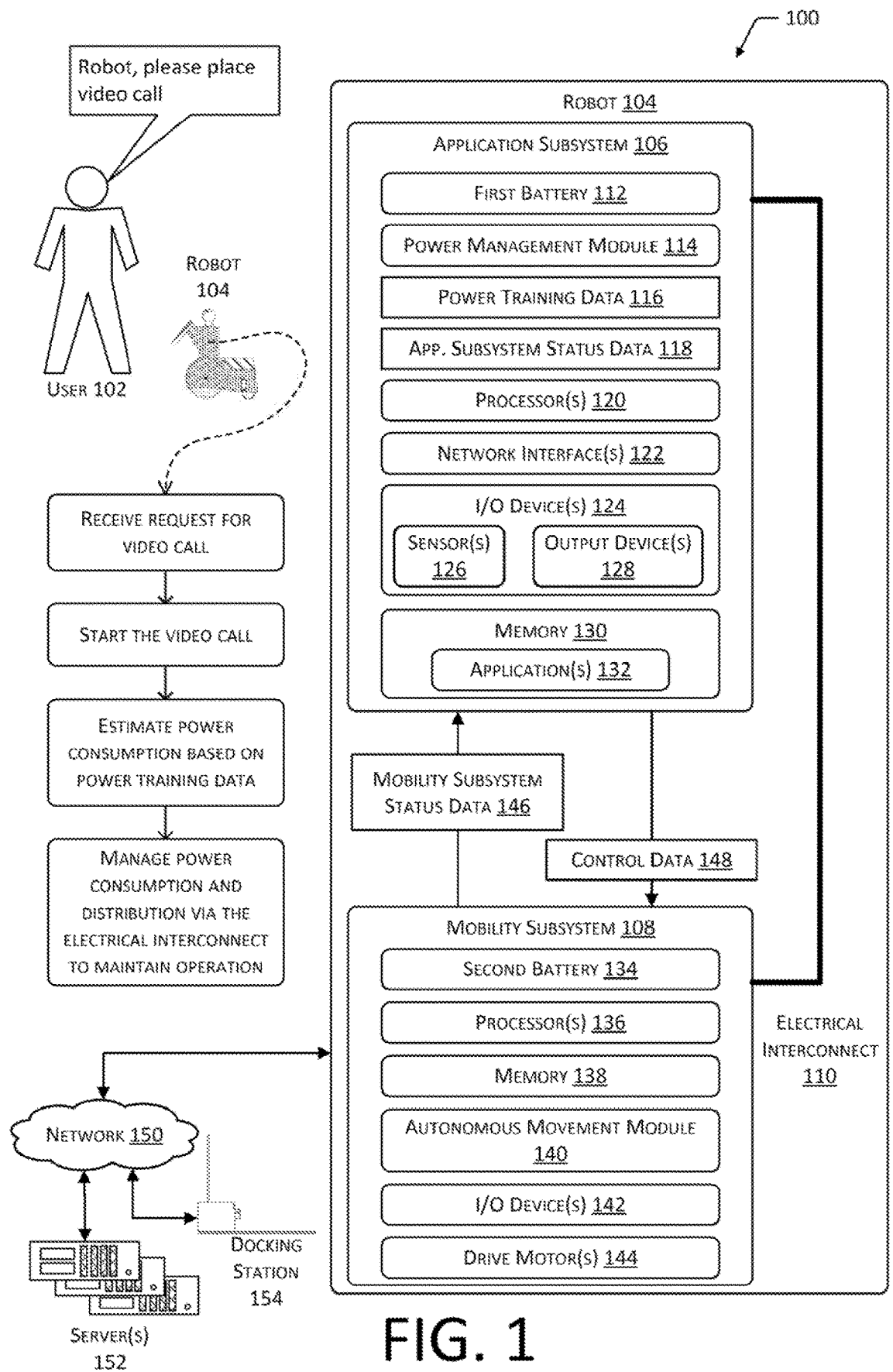
FIG. 1 illustrates a system that includes a robot which is able to dynamically allocate power between multiple batteries, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Every day a user may face a wide variety of different tasks to be completed. These tasks may include monitoring what is happening in another room of the home, staying in communication with other people, performing household chores, operating a vehicle, and so forth. Some of these tasks may either be completed by a robotic assistant or assisted at least in part by the robotic assistant ("robot").

The user may request that the robot perform various tasks. These tasks may include one or more of executing a particular application or moving the robot. Applications may include particular computer programs comprising instructions, that when executed, perform various functions. For example, a first task may involve the user requesting the robot to play a particular song using a music application. In another example, a second task may involve the user requesting the robot to move to a different room. In another example, a third task may involve the user requesting the robot to initiate a video call and follow the user as they move throughout the home.

The robot may comprise two subsystems: an application subsystem and a mobility subsystem. The application subsystem may comprise one or more processors, one or more memories, sensors such as microphones, output devices such as a display and speakers, and so forth. The applications may execute on the one or more processors of the application subsystem. The application subsystem may have particular power requirements, such as requiring 3.3 and 5 volts DC. The application subsystem may include a first battery to provide electrical power to the other components of the subsystem, such as the one or more processors and so forth. The first battery may provide the voltage required by the components of the application subsystem.

The mobility subsystem provides the capability for the robot to move about an environment. The mobility subsystem may comprise one or more processors, one or more memories, sensors such as cameras and ultrasonic sensors, output devices such as warning lights, one or more motors, and so forth. During operation, the mobility subsystem accepts instructions that direct movement, and then attempts to perform those movements. For example, the application subsystem may provide instructions directing movement of the robot to a different room. The mobility subsystem may use these instructions and, responsive to data obtained from the sensors, operate the motors to move the robot. The mobility subsystem may be configured to avoid objects such as walls, people, stairs, and so forth.

The mobility subsystem may have particular power requirements, that differ from the application subsystem. For example, the mobility subsystem may use 14.4 volts DC to drive the motors. The mobility subsystem may include a second battery to provide electrical power to the other components of the subsystem, such as the one or more processors, the sensors, the motors, and so forth. In some implementations the second battery may have a greater charge capacity than the first battery. For example, the watt-hour capacity of the second battery may be greater than the first battery.

As described in this disclosure, a "battery" may comprise one or more individual cells. For example, a battery may comprise three electrochemical cells. The techniques described in this disclosure may be applied to other types of power sources or energy storage devices including, but not limited to: fuel cells, flywheels, capacitors, superconductors, and so forth.

The use of separate batteries for the application subsystem and the mobility subsystem provides several benefits. For example, increased momentary current demands, such as startup of the motor, could result in a momentary decrease in bus voltage, leading to a "brownout" condition. Such a brownout could adversely affect the operation of other devices on the same bus. By using a separate battery for each subsystem, brownouts of the application subsystem may be avoided due to momentary current demand by the motor. The use of separate batteries also reduces power losses due to the conversion of a battery voltage to another voltage better suited for operation of a respective subsystem. Changing electrical power from one voltage to another introduces energy losses. For example, a conversion of direct current (DC) from a first voltage to a second voltage may introduce losses of approximately 26%. By using the separate batteries, the losses due to conversion may be minimized.

An electrical interconnect provides an electrical connection between the application subsystem and the mobility subsystem. The electrical interconnect may be used to transfer power between the systems. For example, power may be transferred from the second battery to power the application subsystem or power may be transferred from the first battery to power the mobility subsystem. Operation of the electrical interconnect may be controlled by a power management module. The power management module may also perform one or more other power-related functions, including but not limited to managing battery charging, determining a battery's charge, and so forth.

As described in this application, the power management module enables dynamic allocation of electrical power available in the robot's batteries by controlling the transfer of power using the electrical interconnect. The dynamic allocation is informed by power training data that is obtained during usage of the robot. The power training data may be specific to that particular robot and to the environment in which it is operated. In some implementations the power training data may be user specific. The power training data associates classifications that are based on mobility and application requirements for particular tasks with estimated power consumption. For example, the user may request the robot to perform a task that includes slow movement and a video call. Charge status of the batteries powering the respective subsystems is determined before and after the task, and the difference is used to determine the total power consumption associated with that task. For example, the charge status may be indicative of the number of watt-hours of available power that are actually stored by the battery, or estimated to be stored by the battery.

During operation of the system, when a request is made for the robot to complete a task, the power training data is used to determine an estimated power consumption. Aspects of the task, such as the particular application(s) called for during that task and the mobility requirements of the robot during that task are considered and used to determine a classification. Based on the classification, the power training data is used to determine the estimated power consumption. The estimated power consumption may then be used to dynamically allocate power between the batteries. For example, if the estimated power consumption for the application subsystem exceeds the charge available in the first battery, the power management module may deplete the first battery to a predetermined charge. For example, the predetermined charge may comprise a minimum charge below which discharge is avoided to avoid potential damage to the first battery. Once the predetermined charge of the first battery is reached, the power management module may use the electrical interconnect to transfer power from the second battery to operate the application subsystem.

By using the techniques described in this disclosure, useful runtime of the robot when performing some tasks is extended compared to a system without the electrical interconnect. For example, a task that uses the application subsystem heavily and thus exhibits significant power consumption would previously be limited to the capacity of the first battery. With the techniques and devices described herein, the application subsystem is able to operate beyond the limit imposed by the first battery.

Additionally, the dynamic allocation may be used to improve overall operational lifespan of the batteries. Without dynamic allocation, demands on the application subsystem to perform tasks could result in discharge of the first battery below a predetermined charge status. Deep discharges of the first battery below the predetermined charge status may result in degradation of the battery, reducing battery capacity, decreased operational lifespan, increasing risk of cell failure, and so forth. By using the dynamic allocation, discharge of the first battery may be stopped at the predetermined charge status and power for the application subsystem may then be drawn from the second battery. As a result, the first battery is not deeply discharged, reducing stress on the battery and increasing operational lifespan.

Illustrative System

FIG. 1 illustrates a system 100 in which a user 102 uses a robot 104 that is able to dynamically allocate power between multiple batteries, according to some implementations. The robot 104 may include various subsystems, such as an application subsystem 106 and a mobility subsystem 108. An electrical interconnect 110 allows for the transfer of electrical power between the subsystems. The electrical interconnect 110 may comprise electrical conductors, such as wires, power conversion or conditioning equipment such as direct-current (DC) to DC converters, and so forth.

The application subsystem 106 is primarily powered by a first battery 112. As described in this disclosure, a "battery" may comprise one or more individual cells. For example, the first battery 112 may comprise three electrochemical cells. The techniques described in this disclosure may be applied to other types of power sources or energy storage devices including, but not limited to: fuel cells, flywheels, capacitors, superconductors, and so forth. For example, the first battery 112 may comprise one or more supercapacitors.

The application subsystem 106 may include or may be in communication with a power management module 114. The power management module 114 may be configured to perform one or more of the operations including, but not limited to, dynamic allocation of power between the application subsystem 106 and the mobility subsystem 108 using the electrical interconnect 110. In some implementations, the power management module 114 may be implemented at least in part using a power management integrated circuit (PMIC).

During operation, the power management module 114 may utilize power training data 116 to determine when to transfer power between the mobility subsystem 108 and the application subsystem 106. As described below, the power training data 116 associates a particular classification with estimated power consumption. The classification may be based on one or more of the type of task and how that task is expected to utilize one or more of the application subsystem 106 or the mobility subsystem 108.

The power training data 116 may be determined based on previous usage of the robot 104. The power training data 116 may be specific to the particular robot 104, to the particular environment in which the robot 104 is being operated, to the user 102, and so forth. For example, the power training data 116 may be determined for a particular geolocation, such as a particular house. Continuing the example, the robot 104 may determine geolocation data indicative of the geolocation of the robot 104. The geolocation data may be determined based on network connectivity, radionavigation receiver, and so forth. In another example, the power training data 116 may be determined that is associated with a particular user 102 at the particular house. The power training data 116 is discussed in more detail at least with regard to FIG. 4.

During operation, the application subsystem 106 may provide application subsystem status data 118. The application subsystem status data 118 may comprise information such as a charge status of the first battery 112, particular applications that are currently being executed or in queue for execution, and so forth. For example, the charge status of the first battery 112 may comprise information indicative of watt-hours of power stored in the first battery 112. The power management module 114 may use the application subsystem status data 118 at least in part to manage the power allocation between the application subsystem 106 and the mobility subsystem 108. The functions provided by the power management module 114 are discussed in more detail below with regard to FIGS. 5-8.

The application subsystem 106 includes one or more hardware processors (processors) 120. The processors 120 may comprise one or more cores. The processors 120 may include microcontrollers, systems on a chip, field programmable gate arrays, digital signals processors, graphic processing units, general processing units, and so forth. One or more clocks may provide information indicative of date, time, ticks, and so forth. For example, the processor 120 may use data from the clock to associate a particular task with a particular point in time.

The robot 104 may include one or more communication interfaces such as input/output (I/O) interfaces, network interfaces 122, and so forth. The communication interfaces enable the robot 104, or components thereof, to communicate with other devices or components. The I/O interfaces may comprise Inter-Integrated Circuit (I2C), Serial Peripheral Interface bus (SPI), Universal Serial Bus (USB) as promulgated by the USB Implementers Forum, RS-212, and so forth.

The network interfaces 122 may be configured to provide communications between the robot 104 and other devices such as other robots 104, a docking station 154, routers, access points, and so forth. The network interfaces 122 may include devices configured to couple to personal area networks (PANs), local area networks (LANs), wireless local area networks (WLANS), wide area networks (WANs), and so forth. For example, the network interfaces 122 may include devices compatible with Ethernet, Wi-Fi, Bluetooth, Bluetooth Low Energy, ZigBee, and so forth.

The I/O interface(s) may couple to one or more I/O devices 124. The I/O devices 124 may include input devices such as one or more sensors 126. The I/O devices 124 may also include output devices 128 such as one or more of a motor, light, speaker, display, projector, printer, and so forth. In some embodiments, the I/O devices 124 may be physically incorporated with the robot 104 or may be externally placed. Network interfaces 122, sensors 126, and output devices 128 are discussed in more detail below with regard to FIG. 3.

The robot 104 may also include one or more busses or other internal communications hardware or software that allow for the transfer of data between the various modules and components of the robot 104.

The application subsystem 106 of the robot 104 includes one or more memories 130. The memory 130 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 130 provides storage of computer-readable instructions, data structures, program modules, and other data for the operation of the robot 104. A few modules are shown stored in the memory 130, although the same functionality may alternatively be implemented in hardware, firmware, or as a system on a chip (SoC).

The memory 130 may store one or more applications 132 that may be executed at least in part by the one or more processors 120. For example, the applications 132 may provide various functionality such as placing a video call, following the user 102 as they move, playing audio content, presenting video content, and so forth. In some implementations one or more of the functions associated with the power management module 114 may comprise instructions that are stored within the memory 130 and executed at least in part on the one or more processors 120. Additional modules that may be stored within the memory 130 are discussed below with regard to FIG. 2.

The mobility subsystem 108 is primarily powered by a second battery 134. In some implementations, the second battery 134 may differ in terms of output voltage, storage capacity, co-position, and so forth with respect to the first battery 112. For example, the second battery 134 may provide an output voltage that is greater than the first battery 112 and may also have a greater watt hour capacity compared to the first battery 112.

The mobility subsystem 108 includes one or more hardware processors (processors) 136. The processors 136 may comprise one or more cores. The processors 136 may include microcontrollers, systems on a chip, field programmable gate arrays, digital signals processors, graphic processing units, general processing units, and so forth. One or more clocks may provide information indicative of date, time, ticks, and so forth. In some implementations, the processors 136 may be the same as, or may differ from, the processors 120. The mobility subsystem 108 may also comprise one or more memories 138 comprising CRSM. In some implementations, the memory 138 may be the same as, or may differ from, the memory 130.

The mobility subsystem 108 may include an autonomous movement module 140, one or more I/O devices 142, and one or more drive motors 144. During operation, the mobility subsystem 108 may provide mobility subsystem status data 146 to the application subsystem 106 or to the power management module 114, if the power management module 114 is external to the application subsystem 106. The mobility subsystem status data 146 may comprise information such as a charge status of the second battery 134, particular functions that the mobility subsystem 108 is being called upon to provide, speed of the movement of the robot 104, and so forth.

The autonomous movement module 140 may be implemented as one or more of dedicated hardware, instructions stored in the memory 138 and executed on one or more processors 136, as instructions executed on an external device such as a server 152 that is accessed via the network interfaces 122, and so forth. The autonomous movement module 140 may be configured to move the robot 104. In some situations, the movement may be responsive to instructions directing movement of the robot that are associated with a particular task. For example, the user 102 may issue a request to the robot 104 for the robot 104 to follow the user 102. The request may be processed by the application subsystem 106 that sends control data 148 to the mobility subsystem 108 comprising instructions that direct the robot 104 to follow the user 102.

The autonomous movement module 140 of the mobility subsystem 108 may use sensor data from the one or more sensors 126 to find the user 102 in the environment, determine a path to move the robot 104, determine obstacles to be avoided, and control operation of the drive motors 144 to move the robot 104.

In some implementations, the application subsystem 106 and the mobility subsystem 108 may have separate I/O devices 124 and 142. For example, the application subsystem 106 may have a dedicated microphone while the mobility subsystem 108 has a LIDAR sensor. In other implementations, the sensors 126 may be used by one or more of the subsystems.

In some situations, the power management module 114 may determine that there is insufficient charge remaining in the batteries to maintain a specified available battery charge once a particular task is completed. In these situations, the power management module 114 may be configured to generate control data 148 that instructs the mobility subsystem 108 to reduce speed of the drive motors 144. Such a reduction in speed may be used to conserve electrical power and extend the run time of the robot 104.

The robot 104 may use the network interfaces 122 to connect to a network 150. For example, the network 150 may comprise a wireless local area network, that in turn is connected to a wide area network such as the Internet. The robot 104 may access one or more servers 152 via the network 150. For example, the robot 104 may utilize a wake word detection module to determine if the user 102 is addressing a request to the robot 104. The wake word detection module may hear a specified word or phrase and transition the robot 104 or portion thereof to a particular operating mode. Once "awake", the robot 104 may then transfer at least a portion of the audio spoken by the user 102 to the servers 152 for further processing. The servers 152 may process the spoken audio and return to the robot 104 data that may be subsequently used to operate the robot 104.

In this illustration, the user 102 is shown making a request for a task that involves the robot 104 placing a video call. The robot 104 may receive the request for the task that includes a video call, start the video call, estimate power consumption based on power training data 116, and manage power consumption and distribution via the electrical interconnect 110 to maintain operation.

The robot 104 may be configured to dock or connect to a docking station 154. The docking station 154 may also be connected to the network 150. For example, the docking station 154 may be configured to connect to the wireless local area network such that the docking station 154 and the robot 104 may communicate. Operation functionality of the docking station 154 is described in more detail below with regard to FIG. 13.

In other implementations, other types of an autonomous mobile device (AMD) may use the systems and techniques described herein. For example, the AMD may comprise an autonomous ground vehicle that is moving on a street, an autonomous aerial vehicle in the air, and so forth.

Figure 2:
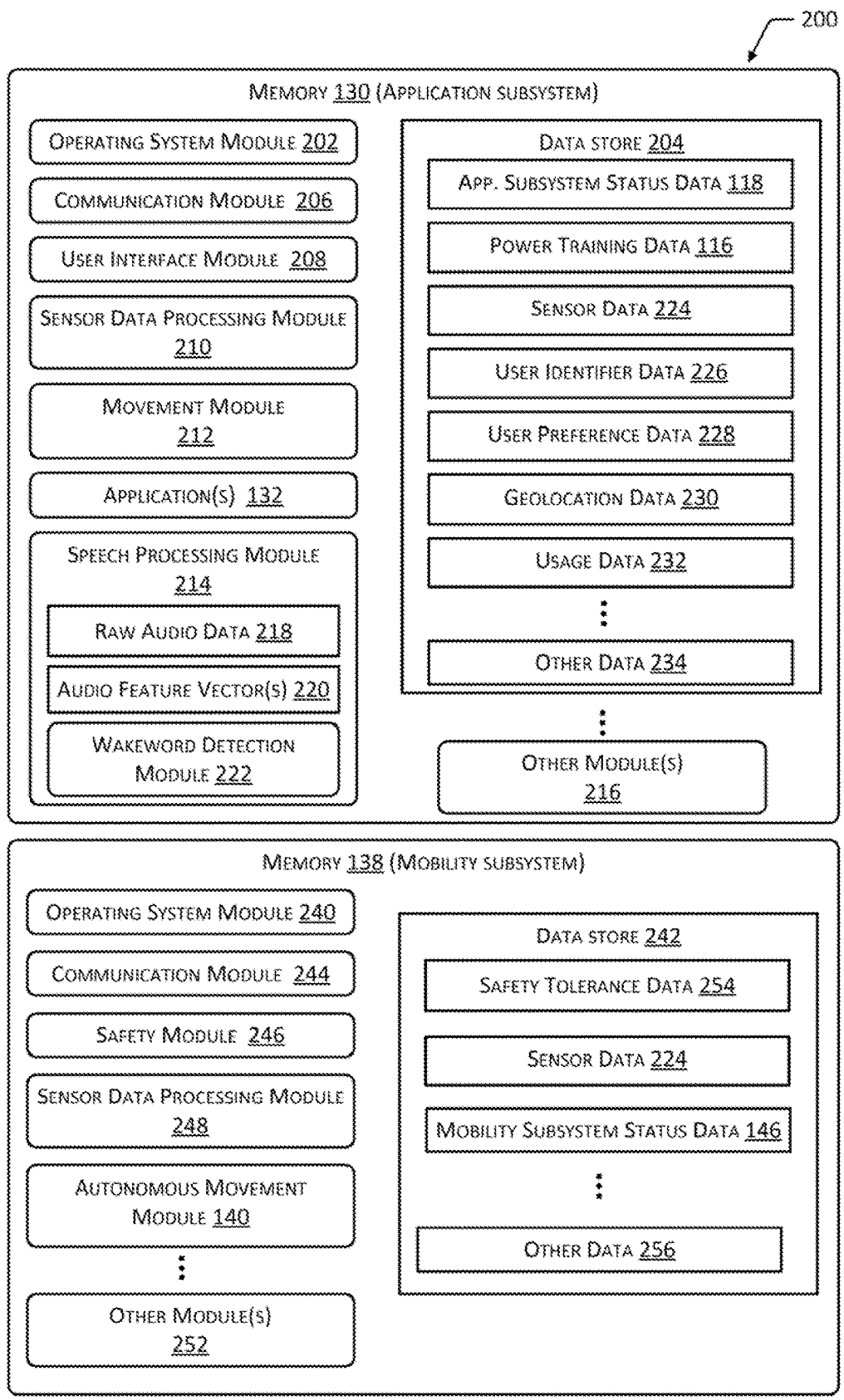
FIG. 2 is a block diagram of contents of memories of the robot, according to some implementations.

FIG. 2 is a block diagram 200 of the contents of memories of the robot 104, according to some implementations. The memory 130 may include at least one operating system (OS) module 202. The OS module 202 is configured to manage hardware resource devices such as the I/O interfaces, the I/O devices 124, the network interfaces 122, and provide various services to applications or modules executing on the processors 120. The OS module 202 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 130 may be a data store 204 and one or more of the following modules. These modules may be executed as foreground applications, background tasks, daemons, and so forth. The data store 204 may use a flat file, database, linked list, tree, executable code, script, or other data structure to store information. In some implementations, the data store 204 or a portion of the data store 204 may be distributed across one or more other devices including other robots 104, servers 152, network attached storage devices, and so forth.

A communication module 206 may be configured to establish communication with other devices, such as other robots 104, the external server 152, the docking station 154, and so forth. The communications may be authenticated, encrypted, and so forth.

A user interface module 208 may be configured to facilitate interaction between the user 102 and the robot 104. For example, the user interface module 208 may utilize a speech processing module 214 described below to process utterances of the user 102. In another example, the user interface module 208 may be configured to use the output devices 128 to provide sounds, video output, lights, and so forth to communicate information to the user 102.

A sensor data processing module 210 may access sensor data 224 that is acquired from one or more of the sensors 126. The sensor data processing module 210 may provide various processing functions such as de-noising, filtering, change detection, and so forth. Processing of sensor data 224, such as images from a camera sensor 126, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 224. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 224 or other data 234. For example, the ANN may be trained using a supervised learning algorithm such that object identifiers are associated with images of particular objects within training images provided to the ANN. Once trained, the ANN may be provided with the sensor data 224 and produce output indicative of the object identifier.

A movement module 212 is configured to operate in conjunction with the user interface module 208, the application(s) 132, and so forth to generate control data 148 comprising one or more instructions directing movement of the robot 104. The control data 148 is provided to the mobility subsystem 108 that directs the mobility subsystem 108 to move the robot 104.

The application 132 comprises instructions that, when executed, provide one or more functions associated with a particular task. In one example, the task may comprise a security or watchmen task in which the robot 104 travels throughout the physical environment looking for events that exceed predetermined thresholds. Continuing the example, if the robot 104 detects that the ambient temperature is below a minimum level, or that water is present on the floor, or detects a sound of broken glass, an alert may be generated. The alert may be given as an audible, visual, or electronic notification. For example, the electronic notification may involve the robot 104 transmitting data using the network interface 122.

In another example, the task may comprise a "follow me" feature in which the robot 104 follows a user 102. For example, the user 102 may participate in a video call using the robot 104. A camera on a mast may be used to acquire video for transmission while the display is used to present video that is received. The robot 104 may use data from one or more sensors 126 to determine a location of the user 102 relative to the robot 104, and track and follow the user 102. In one implementation, computer vision techniques may be used to locate the user 102 within image data acquired by the cameras. In another implementation, the user's voice may be detected by an array of microphones, and a direction to the voice with respect to the robot 104 may be established. Other techniques may be utilized either alone or in combination to allow the robot 104 to track a user 102, follow a user 102, or track and follow a user 102.

In yet another example, the user 102 may issue a request that summons the robot 104 to a particular location. The user 102 may utter a voice command that is heard by a microphone on the robot 104, a microphone in a smart phone, or another device with a microphone, such as a network enabled speaker or television. Alternatively, the user 102 may issue a command using an app on a smartphone, wearable device, tablet, or other computing device. Given that the location of the device at which the command was obtained is known, the robot 104 may be dispatched to that location. Alternatively, if the location is unknown, the robot 104 may search for the user 102.

The speech processing module 214 may be used to process utterances of the user 102. Microphones may acquire audio in the presence of the robot 104 and may send raw audio data 218 to an acoustic front end (AFE). The AFE may transform the raw audio data 218 (for example, a single-channel, 16-bit audio stream sampled at 16 kHz), captured by the microphone, into audio feature vectors 220 that may ultimately be used for processing by various components, such as a wakeword detection module 222, speech recognition engine, or other components. The AFE may reduce noise in the raw audio data 218. The AFE may also perform acoustic echo cancellation (AEC) or other operations to account for output audio data that may be sent to a speaker of the robot 104 for output. For example, the robot 104 may be playing music or other audio that is being received from a network 150 in the form of output audio data. To avoid the output audio interfering with the device's ability to detect and process input audio, the AFE or other component may perform echo cancellation to remove the output audio data from the input raw audio data 218, or other operations.

The AFE may divide the audio data into frames representing time intervals for which the AFE determines a number of values (i.e., features) representing qualities of the raw audio data 218, along with a set of those values (i.e., a feature vector or audio feature vector) representing features/qualities of the raw audio data 218 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 218, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 220 (or the raw audio data 218) may be input into the wakeword detection module 222 that is configured to detect keywords spoken in the audio. The wakeword detection module 222 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 104 (or separately from speech detection), the robot 104 may use the wakeword detection module 222 to perform wakeword detection to determine when a user intends to speak a command to the robot 104. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 222 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 104 may "wake" and begin transmitting audio data (which may include one or more audio feature vectors 220 or the raw audio data 218) to one or more server(s) 152 for speech processing. The audio data corresponding to audio obtained by the microphone may be sent to a server 152 for routing to a recipient device or may be sent to the server 152 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the local robot 104 prior to sending.

The robot 104 may connect to the network 150 using one or more of the network interfaces 122. One or more servers 152 may provide various functions, such as ASR, natural language understanding (NLU), providing content such as audio or video to the robot 104, and so forth.

The other modules 216 may provide other functionality, such as object recognition, speech recognition, speech synthesis, user identification, and so forth. For example, an ASR module may accept as input raw audio data 218 or audio feature vectors 220 and may produce as output a text string that is further processed and used to provide input, initiate operation of the movement module 212 or an application 132, and so forth. In one implementation, the text string may be sent via a network 150 to a server 152 for further processing. The robot 104 may receive a response from the server 152 and present output, perform an action, and so forth. For example, the raw audio data 218 may include the user saying "robot go to the dining room". The audio data representative of this utterance may be sent to the server 152 that return commands directing the robot 104 to the dining room of the home associated with the robot 104.

The utterance may result in a response from the server 152 that directs operation of other devices or services. For example, the user may say "robot wake me at seven tomorrow morning". The audio data may be sent to the server 152 that determines the intent and generates commands to instruct a device attached to the network 150 to play an alarm at 7:00 am the next day.

The other modules 216 may comprise a speech synthesis module that is able to convert text data to human speech. For example, the speech synthesis may be used by the robot 104 to provide speech that a user 102 is able to understand.

The power management module 114 may store at least a portion of the power training data 116 within the data store 204, in some implementations. The application subsystem status data 118 may also be stored in the data store 204.

The data store 204 may also store additional data such as user identifier data 226 that is indicative of the user identifier of a user 102 associated with the robot 104. For example, one or more of the raw audio data 218 or the audio feature vectors 220 may be processed to determine the user identifier data 226 of a user 102 based on the sound of the user's 102 voice. In another implementation, an image of the user 102 may be acquired using one or more cameras and processed using a facial recognition system to determine the user identifier data 226.

The power management module 114 may use the user identifier data 226 to select particular power training data 116. The power training data 116 associated with a particular user 102 may be retrieved and used to determine the dynamic allocation of power as described below.

The data store 204 may store other data such as user preference data 228. For example, the user preference data 228 may comprise a preferred application 132 or particular configuration associated with a task that is to be used when a user 102 with a particular user identifier is using the robot 104.

Other data such as geolocation data 230 may be obtained that provides information as to the physical location of the robot 104. For example, the geolocation data 230 may indicate city, state, province, country, geographic region, and so forth of the robot 104. In some implementations the geolocation data 230 may distinguish one location from another, but not necessarily provide information about the whereabouts. For example, the geolocation data 230 may indicate "main house" or "guest house" but not indicate the specific location in terms of street address of either location. Based on the geolocation data 230, the power management module 114 may select a particular set of power training data 116 to use. For example, the robot 104 may be used at two different houses. When the robot 104 is at the geolocation associated with the first house, a first set of power training data 116 may be used. When the robot 104 is at the geolocation associated with the second house, a second set of power training data 116 may be used. The geolocation data 230 may be determined based on one or more of network connectivity, radionavigation receiver, and so forth. For example, the geolocation data 230 may be determined based on an identifier such as a service set identifier (SSID), network address, media access control data, and so forth associated with the network 150 to which the robot 104 is connected.

Usage data 232 may also be stored with the data store 204. The usage data 232 may comprise log data or other information that is indicative of operation of the robot 104. For example, the usage data 232 may comprise information indicative of particular applications 132, particular control data 148 to move the robot, and so forth.

The memory 138 of the mobility subsystem 108 may also include an OS module 240. The OS module 240 may utilize the same or different OS as the OS module 202. Also stored in the memory 138 may be a data store 242 and one or more of the following modules. These modules may be executed as foreground applications, background tasks, daemons, and so forth. The data store 242 may use a flat file, database, linked list, tree, executable code, script, or other data structure to store information. In some implementations, the data store 242 or a portion of the data store 242 may be distributed across one or more other devices including other robots 104, servers 152, network attached storage devices, and so forth.

A communication module 244 may be configured to establish communication with other devices, such as other robots 104, an external server 152, the docking station 154, and so forth. The communications may be authenticated, encrypted, and so forth. For example, the communication module 244 may utilize the network interface 122 to receive an occupancy map of the home from the server 152.

Other modules within the memory 138 may include a safety module 246, a sensor data processing module 248, the autonomous movement module 140, or other modules 252. The modules may access data stored within the data store 242, such as safety tolerance data 254, sensor data 224, mobility subsystem status data 146, or other data 256.

The memory 138 may store mobility subsystem status data 146. The mobility subsystem status data 146 may be provided to the application subsystem 106, the power management module 114, or both.

The safety module 246 may access safety tolerance data 254 to determine within what tolerances the robot 104 may operate safely within the physical environment. For example, the safety module 246 may be configured to stop the robot 104 from moving when a carrying handle is extended. In another example, the safety tolerance data 254 may specify a minimum sound threshold which, when exceeded, stops all movement of the robot 104. Continuing this example, detection of sound such as a human yell would stop the robot 104. In another example, the safety module 246 may access safety tolerance data 254 that specifies a minimum distance from an object that the robot 104 may maintain. Continuing this example, when a sensor 126 detects an object has approached to less than the minimum distance, all movement of the robot 104 may be stopped. Movement of the robot 104 may be stopped by one or more of inhibiting operations of one or more of the motors, issuing a command to stop motor operation, disconnecting power from one or more the motors, and so forth. The safety module 246 may be implemented as hardware, software, or a combination thereof.

The safety module 246 may control other factors, such as a maximum speed of the robot 104 based on information obtained by the sensors 126, precision and accuracy of the sensor data 224, and so forth. For example, detection of an object by an optical sensor 126 may include some error, such as when the distance to an object comprises a weighted average between an object and a background. As a result, the maximum speed permitted by the safety module 246 may be based on one or more factors such as the weight of the robot 104, nature of the floor, distance to the object, and so forth. In the event that the maximum permissible speed determined by the autonomous movement module 140 differs from the maximum speed permitted by the safety module 246, the lesser speed may be utilized.

Similar to the sensor data processing module 210, the sensor data processing module 248 may access sensor data 224 that is acquired from one or more of the sensors 126. The sensor data processing module 248 may provide various processing functions such as de-noising, filtering, change detection, and so forth. Processing of sensor data 224, such as images from a camera sensor 126, may be performed by a module implementing, at least in part, one or more of the tools or techniques described above.

The autonomous movement module 140 provides the robot 104 with the ability to navigate within the physical environment without real-time human interaction. In some implementations, the autonomous movement module 140 may incorporate one or more functions of the movement module 212. For example, the autonomous movement module 140 may implement one or more simultaneous localization and mapping ("SLAM") techniques to determine the occupancy map. The SLAM algorithms may utilize one or more of maps, algorithms, beacons, or other techniques to provide navigational data. The navigational data may then be used to determine a path which is then subsequently used to determine a set of commands that drive the motors connected to the wheels. For example, the autonomous movement module 140 may access environment map data during operation to determine relative location, estimate a path to a destination, and so forth.

The autonomous movement module 140 may include an obstacle avoidance module. For example, if an obstacle is detected along a planned route, the obstacle avoidance module may re-route the robot 104 to move around the obstacle or take an alternate route.

The autonomous movement module 140 may utilize various techniques during processing of sensor data 224. For example, image data obtained from cameras may be processed to determine one or more of corners, edges, planes, and so forth. In some implementations corners may be detected and the coordinates of those corners may be used to produce point cloud data.

The occupancy map may be manually or automatically determined. Continuing the example, during the learning phase, or subsequent operation, the robot 104 may generate an occupancy map that is indicative of locations of obstacles such as chairs, doors, stairwells, and so forth.

In some implementations, the occupancy map may include floor characterization data. The floor characterization data is indicative of one or more attributes of the floor at a particular location within the physical environment. During operation of the robot 104, floor characterization data may be obtained. The floor characterization data may be utilized by one or more of the safety module 246, the autonomous movement module 140, the application 132, or other modules 252. For example, the floor characterization data may be used to determine if an unsafe condition occurs such as a wet floor. In another example, the floor characterization data may be used by the autonomous movement module 140 assist in the determination of the current location of the robot 104 within the home. For example, if the autonomous movement module 140 determines that the robot 104 is located in the dining room, but the floor characterization data indicates that the floor is consistent with the living room, an error condition may be generated in which other techniques are used to determine the location of the robot 104 or otherwise resolve the difference. For example, the robot 104 may attempt to return to the docking station 154 and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user 102. For example, the robot 104 may use speech synthesis to ask the user "what room is this?" during a training phase. The utterance of the user 102 may be received by a microphone array and the audio data "this is the living room" may processed and subsequently used to generate the location designator. The floor type may comprise information indicative of the type of flooring associated with a particular location designator. For example, the floor type may be indicative of types such as carpet, wood, tile, and so forth. The floor texture comprises information indicative of the surface texture of the floor, such as whether it is rough, smooth, medium, and so forth. The floor texture may be determined using data obtained from a floor optical motion sensor (FOMS) that is described below with regard to FIG. 3. For example, the texture may be detectable by the FOMS. The coefficient of friction provides data indicative of how slippery the floor is. For example, a very low coefficient of friction is indicative of a slippery surface while high coefficient of friction is a surface in which slippage is minimal. In one implementation, the coefficient of friction may be determined based on data from a friction probe that is in contact with the floor. In another implementation, a predetermined amount of breaking or drag may be applied to one or more of the wheels and the coefficient of friction may be determined based on previously defined parameters such as wheel resistance, amount of breaking applied, amount of power applied to drive wheels, and so forth. In effect, this implementation uses one of the wheels to provide selective drag that is then used to determine the coefficient of friction.

The surface resistivity comprises data indicative of the electrical resistivity of the surface. For example, surface resistivity may be measured between two or more conductive wheels. Different types of floor may exhibit different surface resistivity, and changes in that surface resistivity may be used to indicate changing conditions. For example, a change in the surface resistivity for a particular portion of the floor may be indicative of the presence of water or other liquid on the floor.

The color of the floor may be determined using input from one or more of the cameras 344, the FOMS 316, and so forth. For example, one or more the navigation cameras 344 that are mounted on the front of the robot 104 may be used to acquire color data that is used to determine a color of the floor. In another example, where the FOMS 316 utilizes optoelectronic devices that can determine different colors, output from the FOMS 316 may be used to provide the color data.

Figure 3:
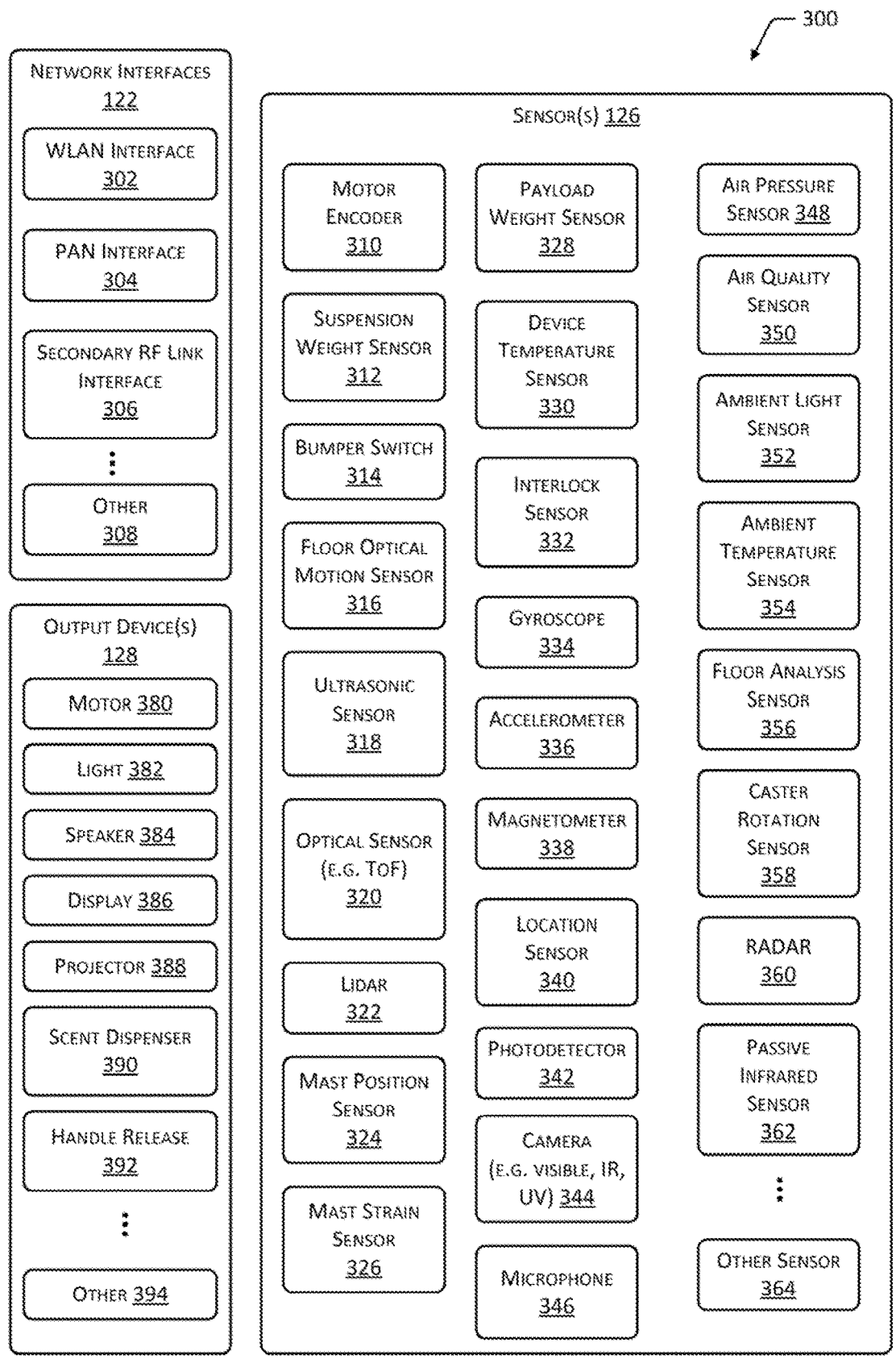
FIG. 3 is a block diagram of some components of the robot such as network interfaces, sensors, and output devices, according to some implementations.

The autonomous movement module 140 may be used to move the robot 104 from a first location to a second location within the physical environment. This movement may be responsive to a determination made by an onboard processor 120, in response to a command received via one or more network interfaces 122, a sensor 126, and so forth. For example, an external server 152 may send a command that is subsequently received using a network interface 122. This command may direct the robot 104 to proceed to a designated destination, such as "living room" or "dining room". The robot 104 may then process this command and use the autonomous movement module 140 to determine the directions and distances associated with reaching the specified destination. FIG. 3 is a block diagram 300 of some components of the robot 104 such as network interfaces 122, sensors 126, and output devices 128, according to some implementations. The components illustrated here are provided by way of illustration and not necessarily as a limitation. For example, the robot 104 may utilize a subset of the particular network interfaces 122, the sensors 126, or output devices 128, depicted here, or may utilize components not pictured.

The network interfaces 122 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilizes frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the robot 104 and other devices in the event that communication fails using one or more of the WLAN interface 302 or the PAN interface 304. For example, in the event the robot 104 travels to an area within the physical environment that does not have Wi-Fi coverage, the robot 104 may use the secondary RF link interface 306 to communicate with another device such as a specialized access point, docking station 154, or other robot 104.

The other 308 network interfaces may include other equipment to send or receive data using other wavelengths or phenomena. For example, the other 308 network interface may include an ultrasonic transceiver used to send data as ultrasonic sounds, a visible light system that communicates via by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The robot 104 may include one or more of the following sensors 126. The sensors 126 depicted here are provided by way of illustration and not necessarily as a limitation. It is understood other sensors 126 may be included or utilized by the robot 104, while some sensors 126 may be omitted in some configurations.

A motor encoder 310 provides information indicative of the rotation or linear extension of a motor. The motor may comprise a rotary motor, or a linear actuator. In some implementations, the motor encoder 310 may comprise a separate assembly such as a photodiode and encoder wheel that is affixed to the motor. In other implementations, the motor encoder 310 may comprise circuitry configured to drive the motor. For example, the autonomous movement module 140 may utilize the data from the motor encoder 310 to estimate a distance traveled.

A suspension weight sensor 312 provides information indicative of the weight of the robot 104 on the suspension system for one or more of wheels 802 or caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel 802, while a "0" value indicates that there is no weight applied to the wheel 802. In other implementations, the suspension weight sensor 312 may provide an indication such as so many kilograms of force or newtons of force. The suspension weight sensor 312 may be affixed to one or more of the wheels 802 or the caster 804. In some situations, the safety module 246 may use data from the suspension weight sensor 312 to determine whether or not to inhibit operation of one or more of the motors. For example, if the suspension weight sensor 312 indicates no weight on the suspension, the implication is that the robot 104 is no longer resting on its wheels, and thus operation of the motors may be inhibited. In another example, if the suspension weight sensor 312 indicates weight that exceeds a threshold value, the implication is that something heavy is resting on the robot 104 and thus operation of the motors may be inhibited.

One or more bumper switches 314 provide an indication of physical contact between a bumper or other member that is in mechanical contact with the bumper switch 314. The safety module 246 utilizes sensor data 224 obtained by the bumper switches 314 to modify the operation of the robot 104. For example, if the bumper switch 314 associated with a front of the robot 104 is triggered, the safety module 246 may drive the robot 104 backwards.

A floor optical motion sensor (FOMS) 316 provides information indicative of motions of the robot 104 relative to the floor or other surface underneath the robot 104. In one implementation, the FOMS 316 may comprise a light source such as a light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 may utilize sounds in excess of 20 kHz to determine a distance from the sensor 126 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within a field-of-view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted that is ultrasonic sound. In another example, the emitter of the ultrasonic sensor 318 may be set to a particular frequency and used to generate a particular waveform such as a sawtooth pattern to provide a signal that is audible to an animal, such as a dog or a cat.

An optical sensor 320 may provide sensor data 224 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 126 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 246 and the autonomous movement module 140 may utilize the sensor data 224 indicative of the distance to an object in order to prevent a collision with that object.

Multiple optical sensors 320 may be operated such that their FOV overlaps at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 224 may be generated that is indicative of the presence of objects and the relative positions, shapes, and so forth is visible to the lidar 322 sensor. Data from the lidar 322 sensor may be used by various modules. For example, the autonomous movement module 140 may utilize point cloud data generated by the lidar 322 sensor for localization of the robot 104 within the physical environment.

A mast position sensor 324 provides information indicative of a position of the mast. For example, the mast position sensor 324 may comprise limit switches associated with the mast extension mechanism that indicate whether the mast 914 is in an extended or retracted position. In other implementations, the mast position sensor 324 may comprise an optical code on at least a portion of the mast 914 that is then interrogated by an optical emitter and a photodetector to determine the distance which the mast 914 is extended. In another implementation, the mast position sensor 324 may comprise an encoder wheel that is attached to a mast motor that is used to raise or lower the mast 914. The mast position sensor 324 may provide data to the safety module 246. For example, if the robot 104 is preparing to deploy the carrying handle, data from the mast position sensor 324 may be checked to determine if the mast 914 is retracted, and if not, the mast 914 may be retracted prior to deployment of the carrying handle. By retracting the mast 914 before the carrying handle is deployed, injury to the user as well as damage to the mast 914 is avoided as the user 102 bends down to grasp the carrying handle.

A mast strain sensor 326 provides information indicative of a strain on the mast 914 with respect to the remainder of the robot 104. For example, the mast strain sensor 326 may comprise a strain gauge or load cell that measures a sideload applied to the mast 914, a weight on the mast 914, or downward pressure on the mast 914. The safety module 246 may utilize sensor data 224 obtained by the mast strain sensor 326. For example, if the strain applied to the mast 914 exceeds a threshold amount, the safety module 246 may direct an audible and visible alarm to be presented by the robot 104.

A payload weight sensor 328 provides information indicative of the weight associated with a modular payload bay 912. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 246 may utilize the payload weight sensor 328 to determine if the modular payload bay 912 has been overloaded. If so, an alert or notification may be issued.

One or more device temperature sensors 330 may be utilized by the robot 104. The device temperature sensors 330 provide temperature data of one or more components within the robot 104. For example, a device temperature sensor 330 may indicate a temperature of one or more the batteries, one or more motors, and so forth. In the event the temperature exceeds a threshold value, the component associated with that device temperature sensor 330 may be shut down.

One or more interlock sensors 332 may provide data to the safety module 246 or other circuitry that prevents the robot 104 from operating in an unsafe condition. For example, the interlock sensors 332 may comprise switches that indicate whether an access panel is open, if the carrying handle is deployed, and so forth. The interlock sensors 332 may be configured to inhibit operation of the robot 104 until the interlock switch indicates a safe condition is present.

A gyroscope 334 may provide information indicative of rotation of an object affixed thereto. For example, gyroscope 334 may generate sensor data 224 that is indicative of a change in orientation of the robot 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or another device. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 104 may include one or more locations sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 224 indicative of impinging light. For example, the photodetector 342 may provide data indicative of a color, intensity, duration, and so forth.

A camera 344 generates sensor data 224 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The robot 104 may use image data acquired by the camera 344 for object recognition, navigation, collision avoidance, user communication, and so forth. For example, a pair of cameras 344 sensitive to infrared light may be mounted on the front of the robot 104 to provide binocular stereo vision, with the sensor data 224 comprising images being sent to the autonomous movement module 140. In another example, the camera 344 may comprise a 10 megapixel or greater camera that is used for videoconferencing or for acquiring pictures for the user 102.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as in progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous movement module 140 may be acquired using a rolling shutter and subsequently may be processed to mitigate image artifacts.

One or more microphones 346 may be configured to acquire information indicative of sound present in the physical environment. In some implementations, arrays of microphones 346 may be used. These arrays may implement beamforming techniques to provide for directionality of gain. The robot 104 may use the one or more microphones 346 to acquire information from acoustic tags, accept voice input from users 102, determine ambient noise level, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include hygrometer that provides information indicative of relative humidity.

An ambient light sensor 352 may comprise one or more photodetectors or other light-sensitive elements that are used to determine one or more of the color, intensity, duration of ambient lighting around the robot 104.

An ambient temperature sensor 354 provides information indicative of the temperature of the ambient environment proximate to the robot 104. In some implementations, an infrared temperature sensor may be utilized to determine the temperature of another object at a distance.

A floor analysis sensor 356 may include one or more components that are used to generate at least a portion of the floor characterization data. In one implementation, floor analysis sensor 356 may comprise circuitry that may be used to determine one or more of the electrical resistance, electrical inductance, or electrical capacitance of the floor. For example, two or more of the wheels 802 in contact with the floor may include an allegedly conductive pathway between the circuitry and the floor. By using two or more of these wheels 802, the circuitry may measure one or more of the electrical properties of the floor. Information obtained by the floor analysis sensor 356 may be used by one or more of the safety module 246, the autonomous movement module 140, the application 132, and so forth. For example, if the floor analysis sensor 356 determines that the floor is wet, the safety module 246 may decrease the speed of the robot 104 and generate a notification alerting the user.

The floor analysis sensor 356 may include other components as well. For example, coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster 804 transitioned from an angle of 0° at a first time to 49° at a second time.

The sensors 126 may include a radar 360. The radar 360 may be used to provide information as to a distance, lateral position, and so forth, to an object.

The sensors 126 may include a passive infrared (PIR) sensor 362. The PIR sensor 362 may be used to detect the presence of people, pets, hotspots, and so forth. For example, the PIR sensor 362 may be configured to detect infrared radiation with wavelengths between 8 and 14 micrometers.

The robot 104 may include other sensors 364 as well. For example, a capacitive proximity sensor may be used to provide proximity data to adjacent objects. Other sensors 364 may include radio frequency identification (RFID) readers, near field communication (NFC) systems, coded aperture camera, and so forth. For example, NFC tags may be placed at various points within the physical environment to provide landmarks for the autonomous movement module 140. One or more touch sensors may be utilized to determine contact with a user 102 or other object.

The robot 104 may include one or more output devices 128. A motor 380 may be used to provide linear or rotary motion. A light 382 may be used to emit photons. A speaker 384 may be used to emit sound. A display 386 may comprise one or more of a liquid crystal display, light emitting diode display, electrophoretic display, cholesterol display, interferometric display, and so forth. The display 386 may be used to present visible information such as graphics, pictures, text, and so forth. In some implementations, the display 386 may comprise a touchscreen that combines a touch sensor and a display 386.

In some implementations, the robot 104 may be equipped with a projector 388. The projector 388 may be able to project an image on the surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

A handle release 392 may comprise an electrically operated mechanism such as one or more of a motor, solenoid, piezoelectric material, electroactive polymer, shape-memory alloy. In one implementation, the handle release 392 may release a latch and allows a spring to push the carrying handle into the deployed position. In another implementation, the electrically operated mechanism may provide the force that deploys the carrying handle. Retraction of the carrying handle may be manual or electronically activated.

In other implementations, other 394 output devices may be utilized. For example, the robot 104 may include a haptic output device that provides output that produces particular touch sensations to the user 102. Continuing the example, a motor 380 with an eccentric weight may be used to create a buzz or vibration to allow the robot 104 to simulate the purr of a cat.

FIG. 4 illustrates a table 400 of power training data 116 that associates particular types of mobility and application tasks with power consumption, according to some implementations. The power training data 116 is illustrated as a table by way of illustration and not necessarily as a limitation. In other implementations, the power training data 116 may be stored in other data structures, executable code, and so forth. In this illustration, the power training data 116 is associated with a particular robot 104 and is also associated with particular users 102. For example, the power training data 116 includes data that indicates particular user identifiers as specified in the user identifier data 226. In some implementations, the power training data 116 may be associated with a particular geolocation, such as indicated by the geolocation data 230.

The power training data 116 may include a classification 402 for requests that is based on one or more of the parameters associated with operation of the mobility subsystem 108 and an application 132, such as mobility speed 404 and the application 132. In some implementations, the mobility speed 404 may be represented by categories, such as low, medium, high, and so forth. The application 132 may indicate the particular application 132 or applications 132 that are associated with the task. For example, the application 132 may be video call application, streaming media application, security application, game application, and so forth. In some implementations, the classification 402 may be associated with a particular application 132 or may be associated with a particular category of application 132. For example, the categories may include games, security, content presentation, and so forth.

Each classification 402 may be associated with power consumption 406 that has been measured from the actual usage of the robot 104. This power consumption 406 is associated with the particular robot 104, and may be associated with particular users 102, a particular geolocation, and so forth. Power consumption 406 may include detail by subsystem, such as mobility 408 and application 410. For example, for a particular classification 402, power consumption used by the mobility subsystem 108 is indicated at 408 while power consumption used by the application subsystem 108 to execute the application 132 is indicated at 410. The classification 402 may also be associated with total power consumption 412, comprising the sum of the power consumption by the application subsystem 106 and the mobility subsystem 108 while carrying out the tasks associated with the classification 402. The power consumption 406 is actual power consumption during performance of the task with the particular classification 402. The actual power consumption may comprise a sum of the actual power used from the first battery 112 and actual power used from the second battery 134, minus the power loss due to operation of the electrical interconnect 110. For example, the actual power consumption does not include power transfer losses of using the electrical interconnect 110, such due to DC-to-DC conversion. In other implementations, the actual power consumption may include the power transfer losses.

The power training data 116 may comprise historical data indicative of previous power consumption by one or more of the execution of the application 132 by the application subsystem 106 or the mobility subsystem 108 that moves the robot based on the instructions directing movement. As described above, in some implementations at least a portion of this historical data may be associated with a particular user identifier. In some implementations, the power training data 116 may be limited to the last k instances of a task of a particular classification 402, where k is a non-zero integer value. For example, the power training data 116 may be based on the last 20 tasks for a particular classification 402.

In some implementations, power training data 116 may be aggregated from a plurality of robots. For example, the user 102 may have several robots 104 within the same house. The power training data 116 from these different robots may be combined. In another example, different users 102 may have the same type of robot 104 in different locations. Power training data 116 may be generated by aggregating data from these different robots 104. In some implementations, this aggregated data may be used as initial power training data 116. For example, power consumption data associated with a particular classification may be accessed, and an average of power consumption determined and subsequently used for the initial power training data 116. In other implementations other techniques may be used. For example, a maximum power consumption in the historical data may be determined and subsequently used for the initial power training data 116. As the user 102 proceeds to use their robot 104, the information associated with these interactions may replace the initial power training data 116.

FIG. 5 depicts tables 500 of differences in runtime associated with a separate dual battery system as compared to the dynamic allocation system described herein, according to some implementations. Depicted is a first table 502 and a second table 504.

The first table 502 depicts a dual battery configuration in which dynamic allocation of power between the application subsystem 106 and the mobility subsystem 108 is not used. In this illustration, several classifications 402 and their corresponding power consumption 406 are illustrated. The first table 502 shows the estimated hours of operation 506 based on the power consumption 406 for the mobility subsystem 108 at shown at 508 and the application subsystem 106 as shown at 510. For example, for the classification 402 of low mobility speed 404 and video call application 132, the mobility subsystem 108 is expected to have 6.4 hours of estimated runtime, while the application subsystem 106 is expected to have 3.4 hours of estimated runtime. In this example, the application subsystem 106 will deplete the charge available within the first battery 112 in approximately 3.4 hours. As a result, the limiting factor for the operation of the robot 104 in this example is the power available to the application subsystem 106. An effective runtime 512 is depicted. The effective runtime 512 in this example is the lesser of the estimated hours of operation 506. Continuing the example, the effective runtime 512 is 3.4 hours for this classification 402. Also shown in the first table 502 is an average runtime 514 for the classifications 402 that are depicted. In this example, the average runtime 514 for the dual battery configuration operated separately is 4.2 hours.

The second table 504 depicts the dual battery with dynamic allocation of power using the electrical interconnect 110. The second table 504 illustrates the various classifications 402 and the estimated hours of operations 506, when the dynamic allocation provided by the power management module 114 is in use. The second table 504 illustrates an effective available charge including the power available from transfer at 516. For example, with the same classification 402 as indicated above that involves a low mobility speed 404 and a video call application 132, by using electrical interconnect 110 to transfer power from the second battery 134 to the application subsystem 106, the effective available charge 516 available to the mobility subsystem 518 is 50.4 Watt-hours (Wh), which is less than the full charge capacity of the second battery 134 of 57.6 Wh. This is the result of a transfer 520 of 7.2 Wh from the second battery 134 to the application subsystem 106. This transfer 520 produces an effective available charge 522 available to the application subsystem 106 of 18.7 Wh, that includes the 16.8 Wh capacity of the first battery 112. By dynamically allocating power, the power management module 114 is able to increase the effective runtime 512 of the various classifications. Such an increase is apparent by comparing the effective runtimes 512 of the first table 502 and the second table 504. By using the dynamic allocation, the average runtime 514 as shown in the second table 504 has increased to 4.9 hours, an average increase of approximately 17%.

It is worth noting that the amount of power transferred 520 comprises the amount of power consumed plus power losses due to power conversion. For example, a DC-to-DC converter and associated systems that convert the voltage of the second battery 134 to voltage suitable for operation of the application subsystem 106 may be approximately 26%. As a result, the amount of power transferred 520 is greater than that actually consumed by the devices in the application subsystem 106.

By using the techniques described in this disclosure, the effective runtime of the robot 104 is significantly improved.

Figure 6:
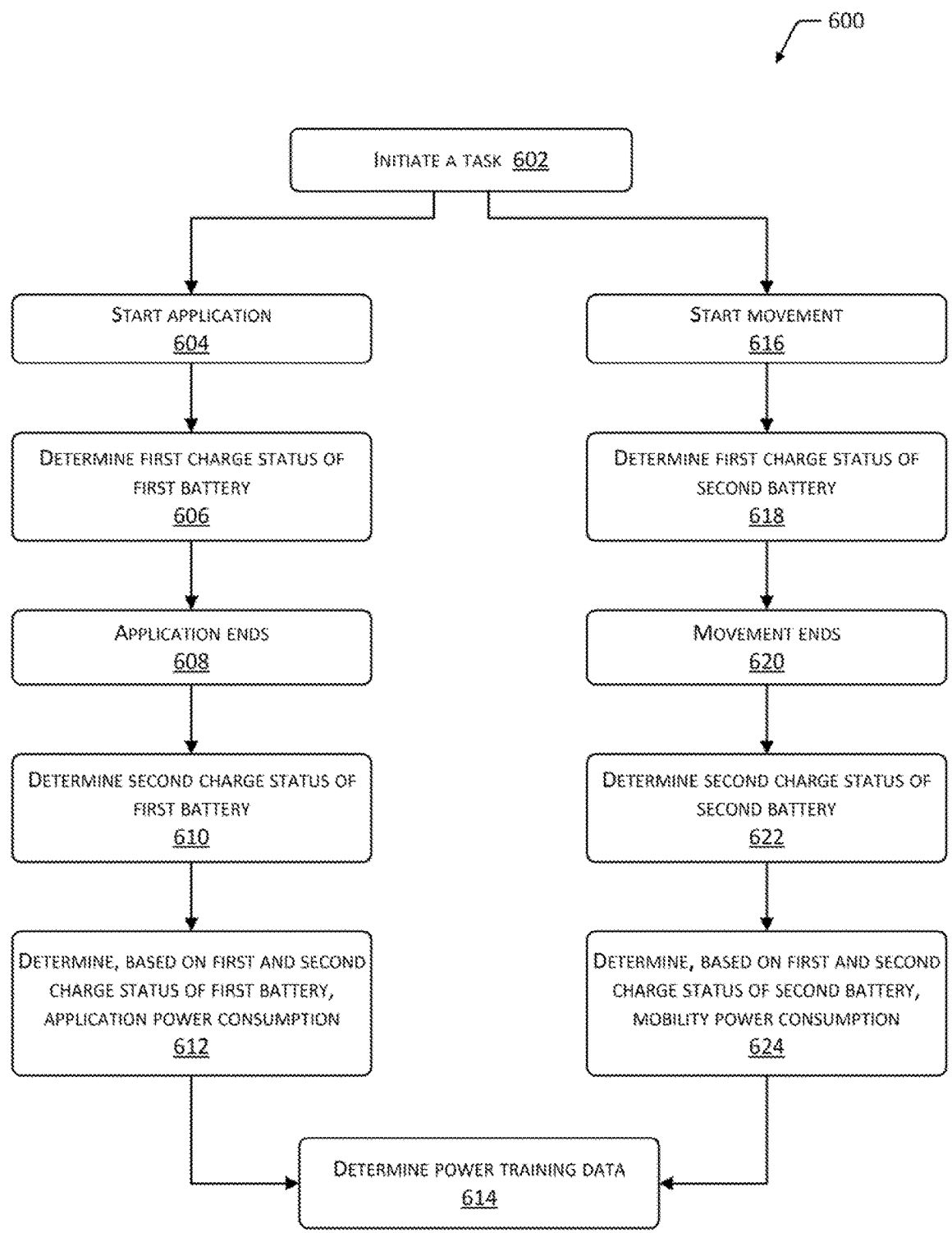
FIG. 6 is a flow diagram of a process to determine power training data, according to some implementations.

FIG. 6 is a flow diagram 600 of a process to determine the power training data 116, according to some implementations. In some implementations, the process may be performed at least in part by the power management module 114.

At 602, the robot 104 initiates a task. The task may include executing a particular application 132, performing one or more movements, and so forth. For example, the user 102 may request a video call, and the robot 104 may receive this request. In another example, the robot 104 may begin a previously scheduled task, such as a sentry operation.

At 604, responsive to the request, the application 132 is started. For example, the request may be for a video call, and the video call application 132 may be executed.

At 606, a first charge status of the first battery 112 is determined. For example, the power management module 114 may communicate with a controller or "gas gauge" processor that is part of the first battery 112 to retrieve data indicative of the current charge status of the first battery 112. Continuing the example, the controller of the battery may report that the first battery 112 has 16.8 Wh of charge available.

At 608, execution of the application 132 ends. Continuing the example, the user 102 may have concluded their video call, and the video call application 132 has closed.

At 610, a second charge status of the first battery 112 is determined. Continuing the example, the controller of the battery may report that the first battery 112 now has 11.8 Wh of charge available.

At 612, based on the first and second charge status of the first battery, application power consumption 410 is determined. For example, 16.8 Wh minus 11.8 Wh is 5 Wh of power consumed.

At 614, the power training data 116 is determined. For example, the power consumption of the application 410 may be determined at 5 Wh. The process may also determine the power consumption 406 of the mobility subsystem 408 as described next, that is associated with the classification 402.

At 616, the robot 104 may start movement or begin preparing to move responsive to one or more instructions directing movement. For example, the control data 148 may direct the mobility subsystem 108 to track and follow the user 102 while the video call is in progress.

At 618, a first charge status of the second battery 134 is determined. For example, the controller of the second battery 134 may be queried and report that the second battery 134 has a first charge status of 57.6 Wh.

At 620, the movement concludes. For example, the video call application 132 may conclude, and the application subsystem 106 may send control data 148 to the mobility subsystem 108 indicating that the robot 104 is to no longer move.

At 622, a second charge status of the second battery 134 is determined. Continuing the example, the controller of the second battery 134 may be queried and report that the second battery 134 has a second charge status of 48.6 Wh.

At 624, based on the first charge status and the second charge status of the second battery 134, mobility power consumption 408 is determined. In this case, the mobility subsystem 108 consumed 9 Wh of power during the video call.

Returning to 614, the power training data 116 is determined based on the classification 402 and using the power consumption of the mobility subsystem 408 and the application subsystem 410. The mobility speed 404 may be determined by the directions instructing movement, such as from the control data 148. In another implementation, the mobility speed 404 may be determined based at least in part on the mobility subsystem status data 146 indicating a speed of the movement.

As the robot 104 is used, information about the classification 402 and actual power consumption 406 associated with those requests may be used to determine the power training data 116. As requests are made for the same classification 402 as previously determined, various techniques may be used. For example, data obtained for the same classification 402 may be averaged, or other statistical techniques may be applied to generate the power consumption 406.

Figure 7:
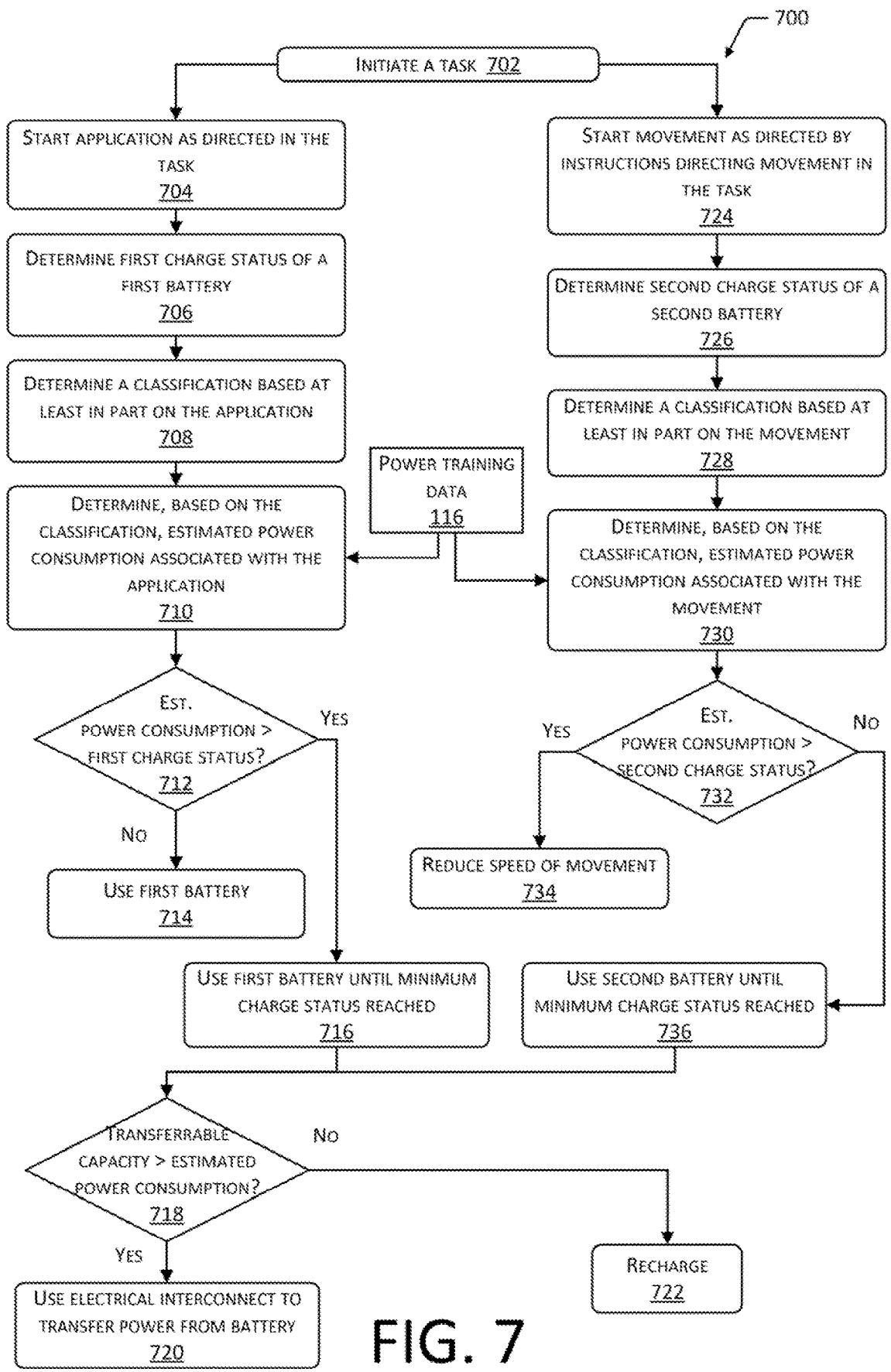
FIG. 7 is a flow diagram of a process to dynamically allocate power between a first subsystem and second subsystem, according to some implementations.

FIG. 7 is a flow diagram 700 of a process to dynamically allocate power between a first subsystem and second subsystem, according to some implementations. In some implementations, the process may be performed at least in part by the power management module 114. While the process is described with respect to a first subsystem such as the application subsystem 106 and a second subsystem such as the mobility subsystem 108, it is understood that the techniques in hardware described in this disclosure may be applied to a plurality of subsystems. For example, three subsystems, each with their own batteries may be managed as described in this disclosure.

At 702, the robot 104 initiates a task. The task may include executing a particular application 132, performing one or more movements, and so forth. For example, the user 102 may request a video call, and the robot 104 may receive this request. In another example, the robot 104 may begin a previously scheduled task, such as a sentry operation.

At 704, responsive to the request, the application 132 is started. For example, the request may be for a video call, and the video call application 132 may be executed.

At 706, a first charge status of the first battery 112 is determined. For example, the power management module 114 may receive data from the controller of the first battery 112 indicating 3 Wh of charge available.

At 708, a classification 402 is determined based at least in part on the application 132. For example, the classification 402 may be determined to be that associated with a low mobility speed 404 and video call application 132. In one implementation, the classification 402 may be retrieved from a lookup table based on one or more of the application 132 to be executed or, as described below with regard to 728, a speed associated with the instructions directing movement.

At 710, based at least in part on the classification 402, estimated power consumption associated with the application 410 is determined using the power training data 116. For example, given the classification 402, the power consumption of the application 410 is estimated to be 5 Wh.

At 712, a comparison is made between the estimated power consumption and the first charge status of the first battery 112. If the estimated power consumption is less than or equal to the first charge status of the first battery 112, the process may proceed to 714.

At 714, the application subsystem 106 operates using the first battery 112. The power management module 114 does not transfer power from the mobility subsystem 108 via the electrical interconnect 110.

Returning to 712, if the estimated power consumption is greater than the first charge status of the first battery 112, the process proceeds to 716.

At 716, the first battery 112 is used to operate the application subsystem 106 until a predetermined charge status is reached. For example, the predetermined charge status may specify a minimum charge for the first battery 112. The power management module 114, the controller of the battery, or other hardware may be configured to prevent discharge of the first battery 112 below the predetermined charge status to prevent damaging the first battery 112.

At 718, a determination may be made as to whether transferable capacity is greater than the estimated power consumption. The transferable capacity comprises the power available from the second battery 134 or other battery. The transferable capacity may take into account the losses associated with the transfer using the electrical interconnect 110. If the transferable capacity is greater than the estimated power consumption, the process may proceed to 720. At 720, electrical interconnect 110 is used to transfer power. Continuing the example above, the electrical interconnect 110 may be used to draw power from the second battery 134 to provide power to operate the application subsystem 106. If at 718 the transferable capacity is less than the estimated power consumption, the process may proceed to 722. At 722, the robot 104 may proceed to recharge. For example, the robot 104 may return to the docking station 154 and begin recharging one or more of the first battery 112 or the second battery 134.

At 724, the robot 104 may start movement or begin preparing to move responsive to one or more instructions directing movement. For example, the control data 148 may direct the mobility subsystem 108 to track and follow the user 102 while the video call is in progress.

At 726, a second charge status of the second battery 134 is determined. For example, the controller of the second battery 134 may be queried and report that the second battery 134 has a second charge status of 56.6 Wh.

At 728, a classification 402 is determined based at least in part on the movement. For example, the mobility speed 404 as indicated in the control data 148 may be used to determine the classification 402 in conjunction with the application 132 as described at 708. While 708 and 728 are depicted as separate operations, it is understood that the two may be combined or operate in conjunction with one another.

At 730, based on the classification 402, estimated power consumption associated with the movement 408 is determined using the power training data 116. Continuing the example, the estimated power consumption may be 9 Wh.

In some implementations, the power training data 116 that is used to determine the estimated power consumption may be associated with a particular user identifier. For example, based on one or more characteristics such as the voice or appearance of the user 102, data entry by the user 102, and so forth, a user identifier indicative of the user 102 may be determined. Based on the user identifier, the power training data 116 associated with that user identifier may be retrieved and subsequently used.

At 732, a determination is made as to whether the estimated power consumption of the mobility subsystem 408 is greater than the second charge status of the second battery 134. If the estimated power consumption of the movement is greater than or equal to the second charge status of the second battery 134, the process may proceed to 734. At 734, the mobility subsystem 108 may reduce the speed of movement in an attempt to reduce power consumption. The movement of the robot 104 may then continue at this reduced speed until completion of the task.

Returning to 732, if the estimated power consumption of the movement is less than the second charge status of the second battery 134, the process may proceed to 736.

At 736, the second battery 134 is operated until a predetermined charge status is reached. As described above, the second battery 134 may have a predetermined charge status below which discharge is prevented to avoid damaging the second battery 134. The process may then proceed to 718.

Figure 8:
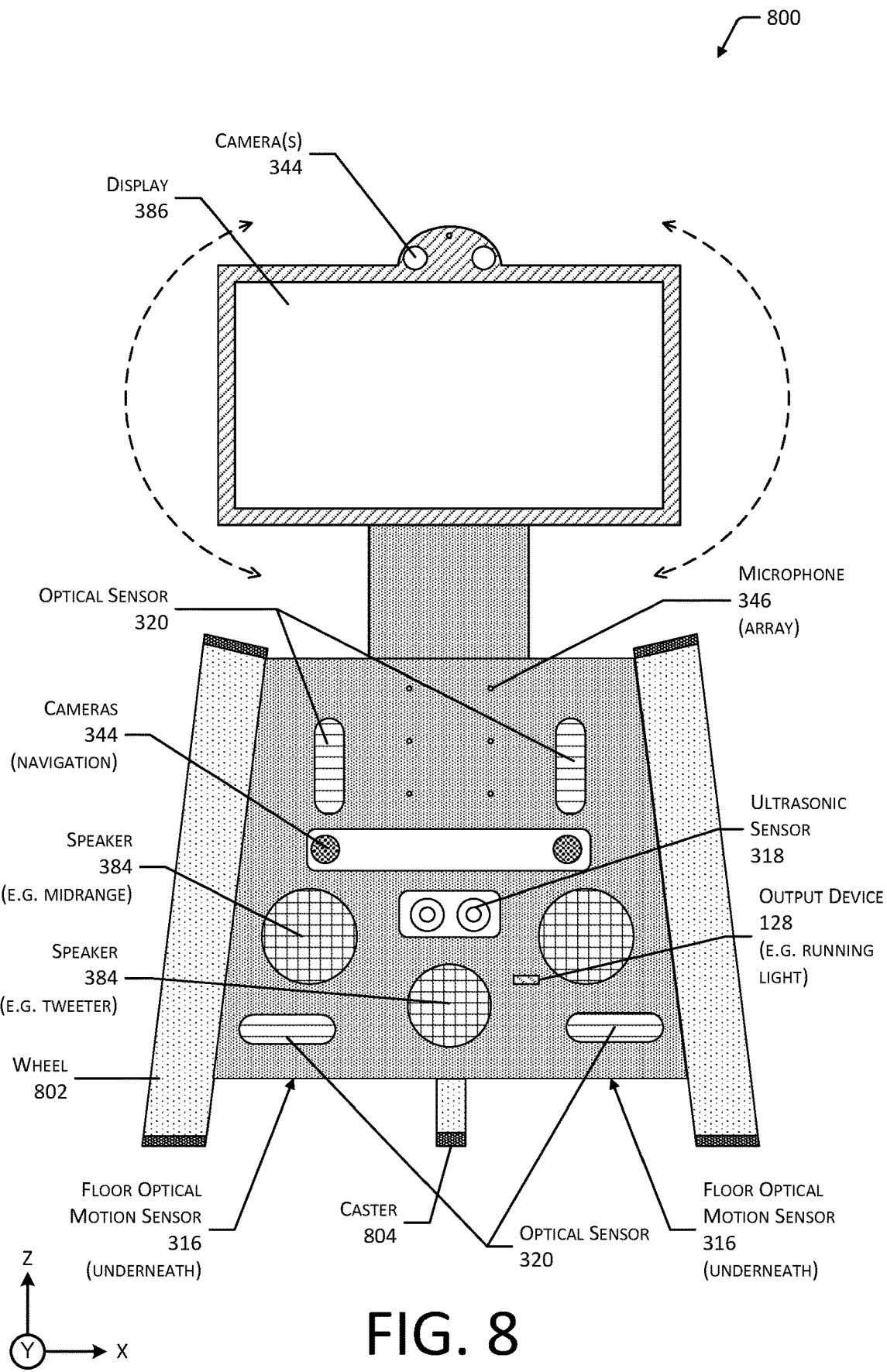
FIG. 8 is a front view of the robot, according to some implementations.

FIG. 8 is a front view 800 of the robot 104, according to some implementations. In this view, the wheels 802 are depicted on the left and right sides of a lower structure. As illustrated here, the wheels 802 are canted inwards towards an upper structure. In other implementations, the wheels 802 may be mounted vertically. The caster 804 is visible along the midline. The front section of the robot 104 includes a variety of sensors 126. A first pair of optical sensors 320 are located along the lower edge of the front while a second pair of optical sensors 320 are located along an upper portion of the front. Between the second set of the optical sensors 320 is a microphone 346 (array).

In some implementations, one or more microphones 346 may be arranged within or proximate to the display 386. For example, a microphone 346 array may be arranged within the bezel of the display 386.

A pair of cameras 344 separated by a distance are mounted to the front of the robot 104 and provide for stereo vision. The distance or "baseline" between the pair of cameras 344 may be between 5 and 15 centimeters (cm). For example, the pair of cameras 344 may have a baseline of 10 cm. In some implementations, these cameras 344 may exhibit a relatively wide horizontal field-of-view (HFOV). For example, the HFOV may be between 90° and 11°. A relatively wide FOV allows for easier detection of moving objects, such as users 102 or pets that may be in the path of the robot 104. Also, the relatively wide FOV facilitates the robot 104 being able to detect objects when turning.

The sensor data 224 comprising images produced by this pair of cameras 344 can be used by the autonomous movement module 140 for navigation of the robot 104. The cameras 344 used for navigation may be of different resolution from, or sensitive to different wavelengths than, cameras 344 used for other purposes such as video communication. For example, the navigation cameras 344 may be sensitive to infrared light allowing the robot 104 to operate in darkness, while the camera 344 mounted above the display 386 may be sensitive to visible light and is used to generate images suitable for viewing by a person. Continuing the example, the navigation cameras 344 may have a resolution of at least 300 kilopixels each while the camera 344 mounted above the display 386 may have a resolution of at least 10 megapixels. In other implementations, navigation may utilize a single camera 344.

In this illustration, the display 386 is depicted with cameras 344 arranged above the display 386. The cameras 344 may operate to provide stereoimages of the physical environment, the user 102, and so forth. For example, an image from each of the cameras 344 above the display 386 may be accessed and used to generate stereo image data about a face of a user 102. This stereoimage data may then be used for facial recognition, user identification, gesture recognition, gaze tracking, and so forth. In other implementations, a single camera 344 may be present above the display 386.

The display 386 may be mounted on a movable mount. The movable mount may allow the display 386 to move along one or more degrees of freedom. For example, the display 386 may tilt, rotate as depicted here, and so forth. The size the display 386 may vary. In one implementation, the display 386 may be approximately 8 inches as measured diagonally from one corner to another.

An ultrasonic sensor 318 is also mounted on the front of the robot 104 and may be used to provide sensor data 224 that is indicative of objects in front of the robot 104.

One or more speakers 384 may be mounted on the robot 104. For example, pyramid range speakers 384 are mounted on the front of the robot 104 as well as a high range speaker 384 such as a tweeter. The speakers 384 may be used to provide audible output such as alerts, music, human speech such as during a communication session with another user 102, and so forth.

One or more bumper switches 314 (not shown) may be present along the front of the robot 104. For example, a portion of the housing of the robot 104 that is at the leading edge may be mechanically coupled to one or more bumper switches 314.

Other output devices 128, such as one or more lights 382, may be on an exterior of the robot 104. For example, a running light may be arranged on a front of the robot 104. The running light may provide light for operation of one or more of the cameras 344, a visible indicator to the user 102 that the robot 104 is in operation, and so forth.

One or more of the FOMS 316 is located on an underside of the robot 104.

Figure 9:
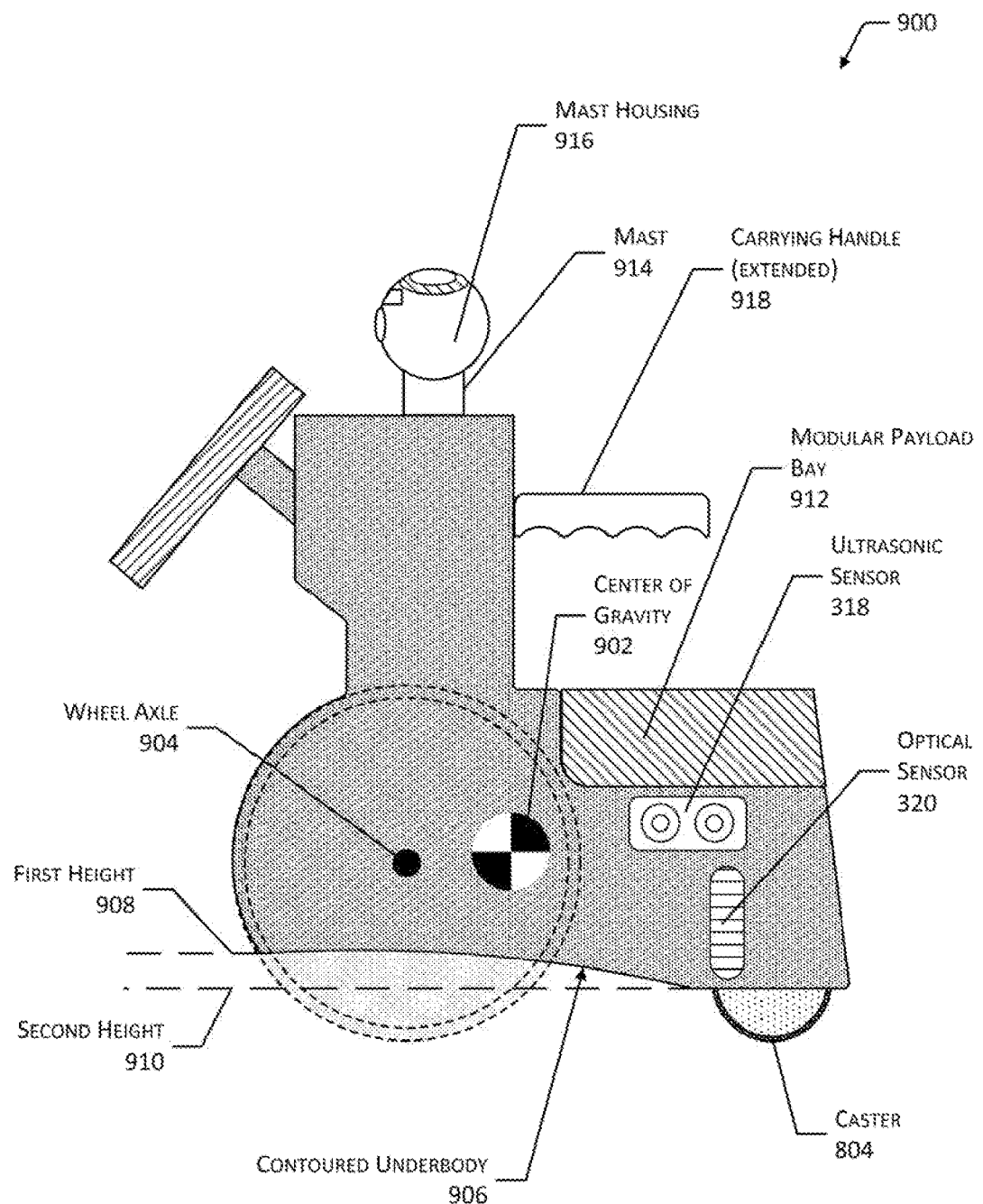
FIG. 9 is a side view of the robot, according to some implementations.

FIG. 9 is a side view 900 of the robot 104, according to some implementations.

The exterior surfaces of the robot 104 may be designed to minimize injury in the event of an unintended contact between the robot 104 and a user 102 or a pet. For example, the various surfaces may be angled, rounded, or otherwise designed to divert or deflect an impact. In some implementations, the housing of the robot 104, or a surface coating may comprise an elastomeric material or a pneumatic element. For example, the outer surface of the housing of the robot 104 may be coated with a viscoelastic foam. In another example, the outer surface of the housing the robot 104 may comprise a shape-memory polymer that upon impact forms but then over time returns to the original shape.

In this side view, the left side of the robot 104 is depicted. An ultrasonic sensor 318 and an optical sensor 320 are present on either side of the robot 104.

Placement of the heavier components of the robot 104 may be arranged such that a center of gravity (COG) 902 is located between a wheel axle 904 of the front wheels 802 and the caster 804. Such placement of the COG 902 may result in improved stability of the robot 104 and may also facilitate lifting by the carrying handle 918.

In this illustration, the caster 804 is shown in a trailing configuration, in which the caster 804 is located behind or aft of the wheel axle 904 and the center of gravity 902. In another implementation (not shown) the caster 804 may be in front of the axle of the wheels 802. For example, the caster 804 may be a leading caster 804 positioned forward of the center of gravity 902.

The robot 104 may encounter a variety of different floor surfaces and transitions between different floor surfaces during the course of operation. The robot 104 may include a contoured underbody 906 that transitions from a first height 908 at the front of the robot 104 to a second height 910 that is proximate to the caster 804. This contour provides a ramp effect such that if the robot 104 encounters an obstacle that is below the first height 908, the contoured underbody 906 helps direct the robot 104 over the obstacle without lifting the driving wheels 802 clear from the floor. As a result, the robot 104 is better able to drive over small obstacles.

The robot 104 may include a modular payload bay 912 located within the lower structure. The modular payload bay 912 provides one or more of mechanical or electrical connectivity with the robot 104. For example, modular payload bay 912 may include one or more engagement features such as slots, cams, ridges, magnets, bolts, and so forth that are used to mechanically secure an accessory within the modular payload bay 912. In one implementation, the modular payload bay 912 may comprise walls within which the accessory may sit. In another implementation, the modular payload bay 912 may include other mechanical engagement features such as slots into which the accessory may be slid and engaged.

The modular payload bay 912 may include one or more electrical connections. For example, the electrical connections may comprise a universal serial bus (USB) connection that allows for the transfer of data, electrical power, and so forth between the robot 104 and the accessory.

The robot 104 may incorporate a display 386 that may be utilized to present visual information to the user 102. In some implementations, the display 386 may be located with or affixed to the upper structure. In some implementations, the display 386 may comprise a touch screen that allows user input to be acquired. The display 386 may be mounted on a movable mount that allows motions along one or more axes. For example, the movable mount may allow the display 386 to be tilted, rotated, and so forth. The display 386 may be moved to provide a desired viewing angle to the user 102, to provide output from the robot 104, and so forth. For example, the output may comprise the display 386 being tilted forward and backward to provide a gestural output equivalent to a human nodding their head.

The robot 104 may incorporate a mast 914. The mast 914 provides a location from which additional sensors 126 or output devices 128 may be placed at a higher vantage point. The mast 914 may be fixed or extensible. The extensible mast 914 is depicted in this illustration. The extensible mast 914 may be transitioned between a retracted state, an extended state, or placed at some intermediate value between the two.

At the top of the mast 914 may be a mast housing 916. In this illustration, the mast housing 916 is approximately spherical, however in other implementations other physical form factors such as cylinders, squares, or other shapes may be utilized.

The mast housing 916 may contain one or more sensors 126. For example, the sensors 126 may include a camera 344 having a field-of-view (FOV). In another example, the sensors 126 may include an optical sensor 320 to determine a distance to an object. The optical sensor 320 may look upward, and may provide information as to whether there is sufficient clearance above the robot 104 to deploy the mast 914. In another example, the mast housing 916 may include one or more microphones 346.

One or more output devices 128 may also be contained by the mast housing 916. For example, the output devices 128 may include a camera flash used to provide illumination for the camera 344, an indicator light that provides information indicative of a particular operation of the robot 104, and so forth.

Other output devices 128, such as one or more lights 382, may be elsewhere on an exterior of the robot 104. For example, a light 382 may be arranged on a side of the upper structure.

In some implementations, one or more of the sensors 126, output devices 128, or the mast housing 916 may be movable. For example, the motor 380 may allow for the mast 914, the mast housing 916, or a combination thereof to be rotated allowing the FOV to be panned from left to right.

The mast 914 may be configured with one or more safety features. For example, a portion of the mast 914 at the base of the mast 914 may be configured to deform or break in the event that a load exceeding a threshold amount is applied to the mast 914. In another implementation, the mounting point for the mast 914 to the upper structure includes one or more breakaway elements, allowing the mast 914 to break away from the upper structure in the event that a load exceeds the threshold amount. In yet another implementation, the mast 914 may comprise a flexible structure that bends when a load exceeding a threshold amount is applied to the mast 914.

In some implementations, the display 386 may be mounted to the mast 914. For example, the display 386 may be incorporated into the mast housing 916. In another example, the display 386 may be mounted to a portion of the mast 914, and so forth.

The robot 104 may occasionally need to be manually transported from one location to another. For example, the robot 104 may be unable to climb stairs, enter a vehicle, and so forth. To facilitate manual transportation, the robot 104 may include a carrying handle 918. The carrying handle 918 may be retractable such that, when not in use, the carrying handle 918 is not accessible. The carrying handle 918 may retract and deploy via translation, rotation, or extension. For example, the carrying handle 918 may slide out from the upper structure, or may rotate about a pivot point at one end. In the event the robot 104 is to be transported, the carrying handle 918 may be deployed. The carrying handle 918 may be positioned such that at least a portion of the carrying handle 918 is over the COG 902 of the robot 104. In another implementation, the carrying handle 918 may deploy upwards from the lower structure.

Deployment of the carrying handle 918 may include manual operation, such as the user pressing a handle release button, or may be electronically activated by the robot 104 using an electrically operated mechanism. For example, the electronic activation may involve the robot 104 generating a command that activates an electrically operated mechanism such as one or more of a motor, solenoid, piezoelectric material, electroactive polymer, shape-memory alloy, and so forth that releases a latch and allows a spring to push the carrying handle 918 into the deployed position. Continuing the example, the user 102 may utter a command such as "robot, deploy carrying handle". Automated speech recognition systems may be used to recognize the utterance and as a result the electrically operated mechanism is activated. In another implementation, the electrically operated mechanism may provide the force that deploys the carrying handle 918. Retraction of the carrying handle 918 may be manual or electronically activated.

By utilizing a retractable carrying handle 918 that may be stowed when not in use, safety of the robot 104 is improved. For example, the retracted carrying handle 918 is no longer exposed to be caught on some other object. Additionally, safety may be further improved by including a safety interlock associated with the carrying handle 918. The safety interlock may be based on data such as information indicative of the deployment of the carrying handle 918, or may be based at least in part on sensor data 224. For example, a switch may be used to indicate whether the carrying handle 918 has been stowed. While the carrying handle 918 is extended, operation of one or more motors 380 in the robot 104 may be inhibited or otherwise prevented from being operated. For example, while the carrying handle 918 is extended, the motors 380 used to drive the wheels 802 may be rendered inoperable such that the robot 104 may not move. In another example, while the carrying handle 918 is extended, the mast 914 may be placed into a retracted position and remain there until the carrying handle 918 has been stowed. By limiting the motion of the robot 104 while the carrying handle 918 is extended for use, the possibility for an adverse interaction between the robot 104 and the user 102 is reduced.

Figure 10:
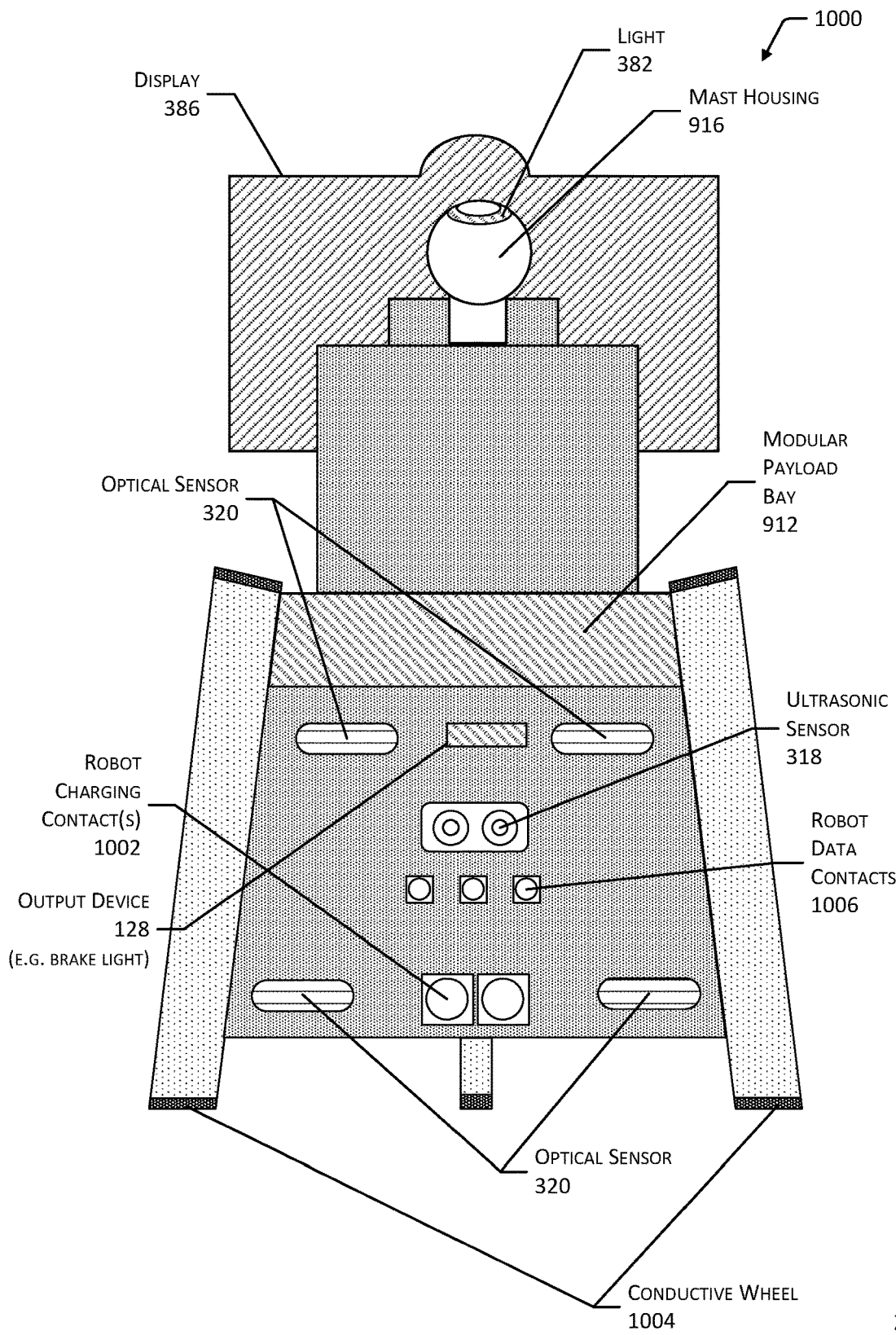
FIG. 10 is a back view of the robot, according to some implementations.

FIG. 10 is a back view 1000 of the robot 104, according to some implementations. In this view, as with the front, a first pair of optical sensors 320 are located along the lower edge of the rear of the robot 104, while a second pair of optical sensors 320 are located along an upper portion of the rear of the robot 104. An ultrasonic sensor 318 provides proximity detection for objects that are behind the robot 104.

Robot charging contacts 1002 may be provided on the rear of the robot 104. The robot charging contacts 1002 may comprise electrically conductive components that may be used to provide power from an external source such as a docking station 154 to the robot 104. In other implementations, wireless charging may be utilized. For example, wireless inductive or wireless capacitive charging techniques may be used to provide electrical power to the robot 104.

In some implementations the wheels 802 may be electrically conductive wheels 1004, that provide an electrical conductive pathway between the robot 104 and the floor.

One or more robot data contacts 1006 may be arranged along the back of the robot 104. The robot data contacts 1006 may be configured to establish contact with corresponding base data contacts within the docking station 154. The robot data contacts 1006 may provide optical, electrical, or other connections suitable for the transfer of data.

Other output devices 128, such as one or more lights 382, may be on an exterior of the back of the robot 104. For example, a brake light may be arranged on the back surface of the robot 104 to provide users 102 an indication that the robot 104 is stopping.

Figure 11:
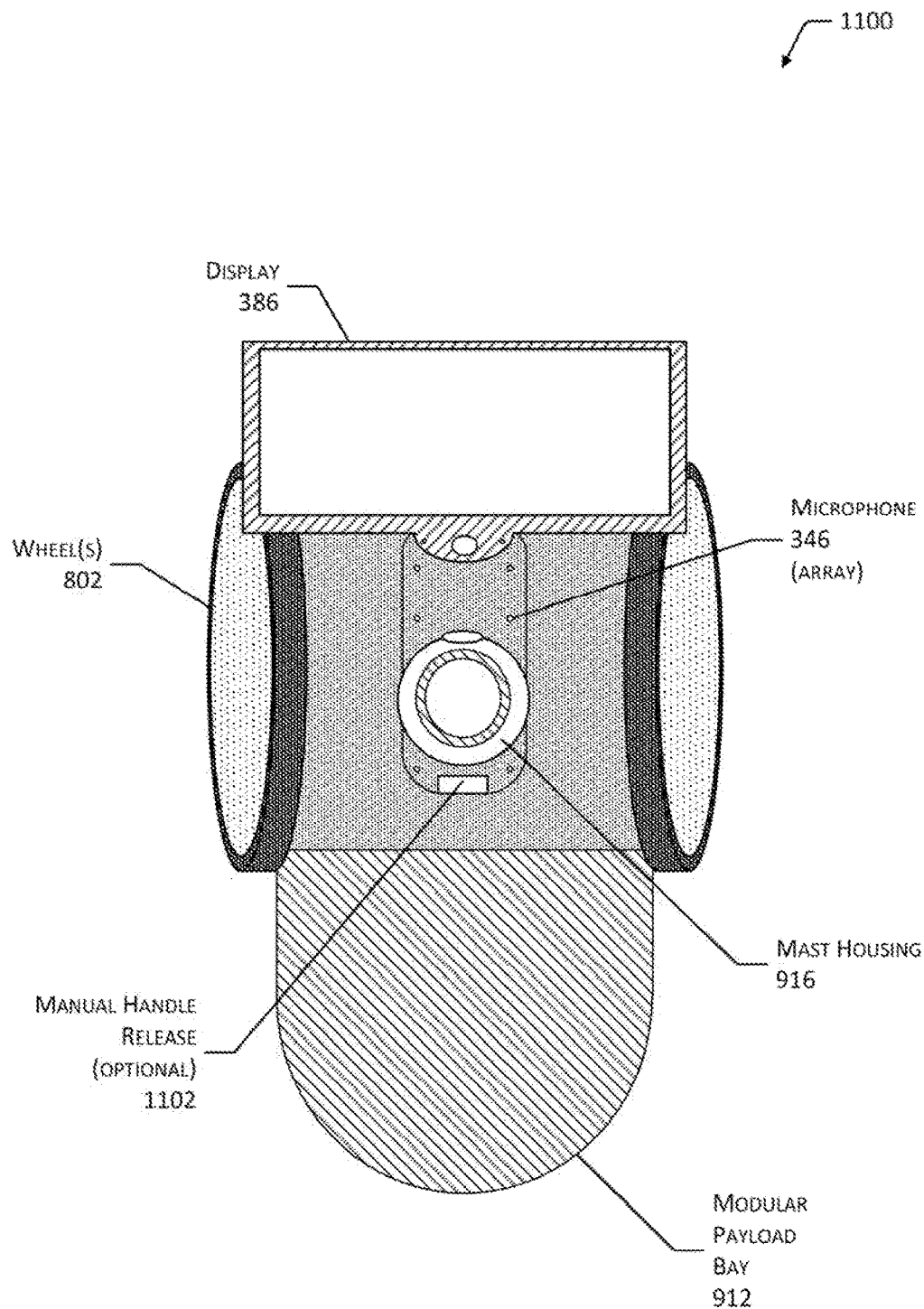
FIG. 11 is a top view of the robot, according to some implementations.

FIG. 11 is a top view 1100 of the robot 104, according to some implementations. In some implementations, a microphone 346 (array) may be emplaced along an upper surface of the upper structure. For example, the microphone 346 (array) is shown here comprising 8 microphones 346, two of which are concealed by the mast housing 916.

In some implementations, a manual handle release 1102 may be optionally provided. For example, the manual handle release 1102 when actuated may result in the carrying handle 918 being extended.

Figure 12:
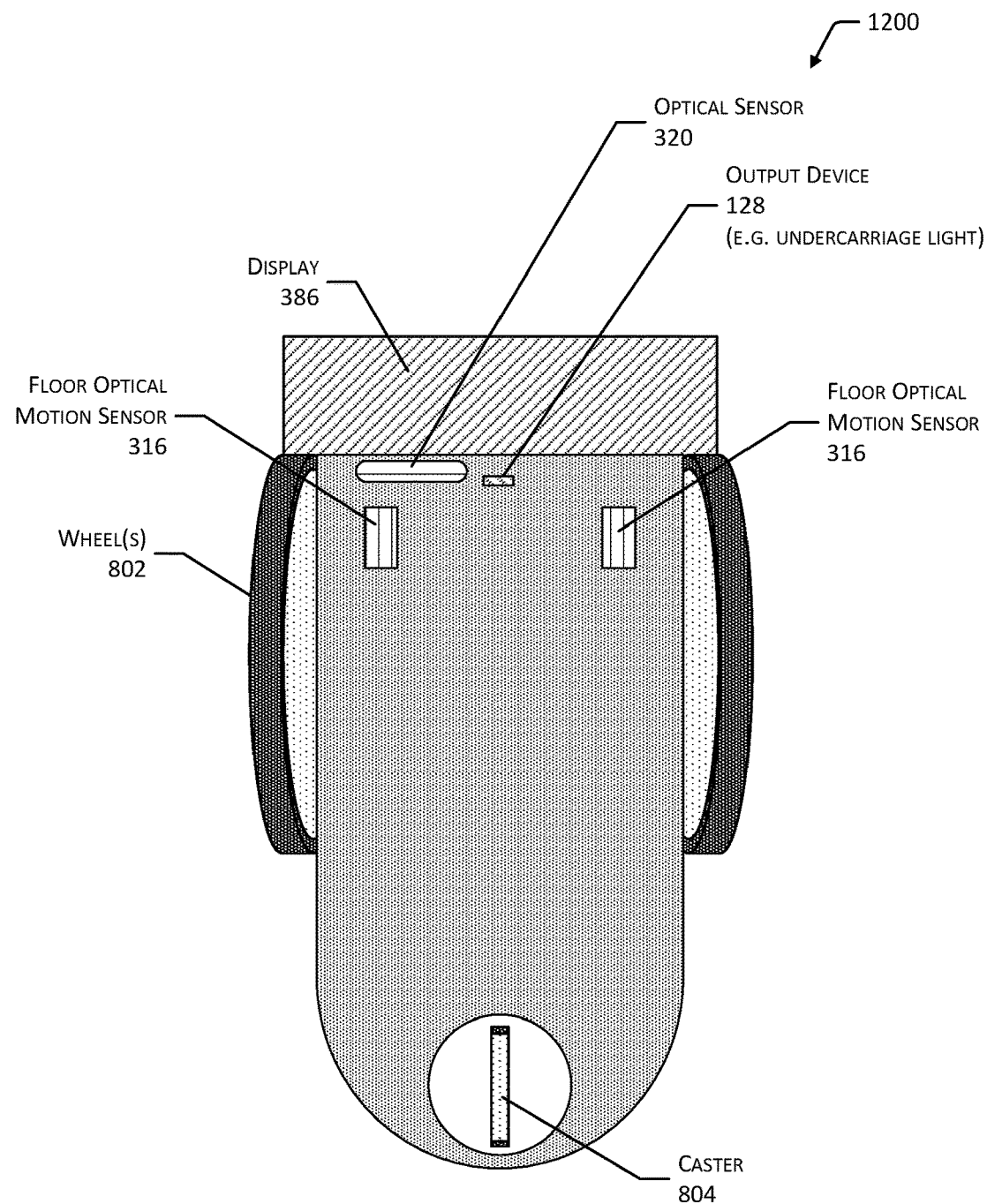
FIG. 12 is a bottom or underside view of the robot, according to some implementations.

FIG. 12 is a bottom 1200 or underside view of the robot 104, according to some implementations. In this illustration, a pair of FOMS 316 are visible and arranged on the underside of the robot 104 proximate to the front and on the left and right sides proximate to the wheels 802. In another implementation, one or more FOMS 316 may be arranged along a centerline of the robot 104 running front and back.

One or more optical sensors 320 may be mounted on the underside proximate to one or more of the front edge or back edge of the robot 104. These optical sensors 320 may be used to detect the presence of a falling edge, such as a stair. For example, the optical sensors 320 mounted on the front or rear of the robot 104 may have a field-of-view (FOV) that results in a blind spot close to the robot 104. In the event that the user picks up and moves the robot 104, the robot 104 could be placed into a situation where it is unable to move safely without toppling from a falling edge. As a result, optical sensors 320 may be mounted at or near the underside of the robot 104 to provide information about this region.

In other implementations, other sensors 126 may be mounted elsewhere to determine falling edges. For example, the optical sensors 320 on the front of the robot 104 may have a FOV that is directed downwards to allow for detection of the falling edge.

An output device 128, such as one or more undercarriage lights may be provided. For example, a light 382 may be arranged on an underside of the robot 104, proximate to or at a front edge.

Also depicted is the caster 804. In one implementation, the caster 804 may be freewheeling, that is free to swivel about. In another implementation, the caster 804 may be driven, such that a motor or other actuator may change the direction of the caster 804 to facilitate steering of the robot 104.

Figure 13:
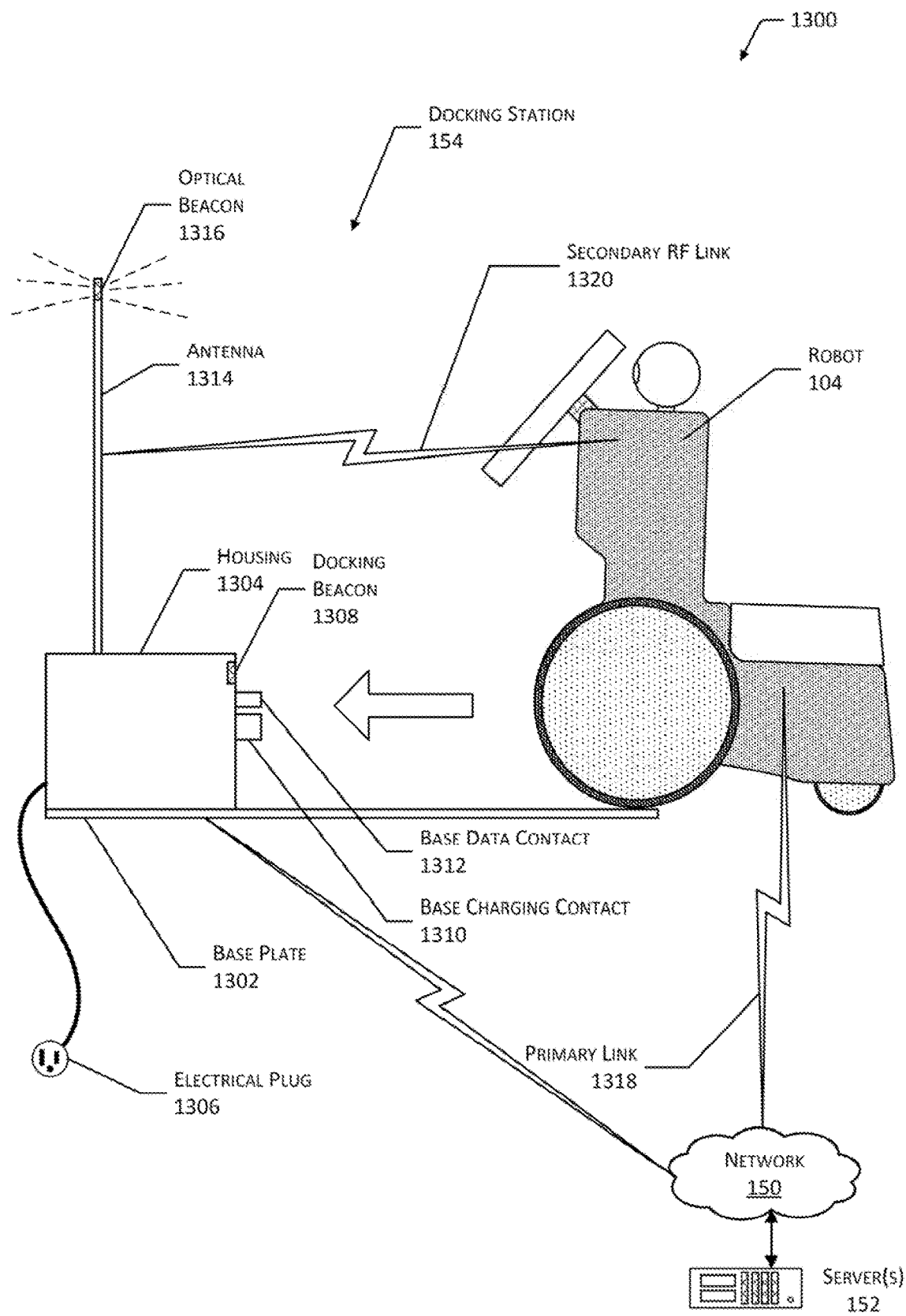
FIG. 13 depicts a diagram of a docking station with a secondary radio frequency link interface, according to some implementations.

FIG. 13 depicts a diagram 1300 of a docking station 154 with a secondary RF link interface 306, according to some implementations. The docking station 154 may comprise a base plate 1302. A housing 1304 may include electronics such as a power supply, one or more processors, one or more communication interfaces, and so forth. The docking station 154 may obtain power from an electrical plug 1306. For example, the electrical plug 1306 may be plugged into a household electrical outlet. In some implementations, the docking station 154 may include an uninterruptible power supply or alternative power source such as a fuel cell.

A docking beacon 1308 provides indicia suitable for guiding the robot 104 into the docking station 154 at a predetermined location. At that predetermined location, the robot 104 may engage one or more base charging contacts 1310 or base data contacts 1312. For example, the robot charging contacts 1002 may come in contact with the corresponding base charging contacts 1310 while the robot data contacts 1006 may come in contact with the corresponding base data contacts 1312. In other implementations, one or more of the base charging contacts 1310 or the base data contacts 1312 may be along the base plate 1302, or otherwise configured to mate with corresponding robot charging contacts 1002 or robot data contacts 1006 located on an underside of the robot 104.

In other implementations, wireless power transfer may be used to charge the robot 104. For example, the base charging contacts 1310 may be omitted and a wireless inductive or wireless capacitive charging system may be used to provide electrical power to the robot 104.

The base charging contacts 1310 may be utilized to provide electrical power to charge the batteries on board the robot 104, supply power to the robot for operation while docked, and so forth. The base data contacts 1312 may be used to provide data communication with the robot 104 while docked. For example, the base data contacts 1312 may be used to deliver updates to the instructions stored within the memory 130 of the robot 104.

The docking station 154 may include an antenna 1314 suitable for use with one or more of the network interfaces 122. For example, the antenna 1314 may be used for the secondary RF link interface 306.

One or more optical beacons 1316 may be provided on the docking station 154 to facilitate the robot 104 locating the docking station 154 within the physical environment. For example, the optical beacons 1316 may be placed atop the antenna 1314 to provide and improve line of sight with the robot 104. In some implementations, the robot 104 may utilize the camera 344 in the mast housing 916 to detect the optical beacon 1316. For example, the mast 914 may be extended to increase the height of the mast housing 916 and the camera 344 therein. The increased height of the camera 344 combined with the location of the optical beacons 1316 atop antenna 1314 may provide an improved line of sight for the robot 104, facilitating locating of the docking station 154 by the robot 104.

The robot 104 may utilize a primary link 1318 to establish communication with other devices such as the network 150, one or more servers 152, the docking station 154, other robots 104, and so forth. For example, the primary link 1318 may comprise a Wi-Fi WLAN interface 302.

In some implementations, the primary link 1318 may be unavailable. For example, a portion of the home may have inadequate Wi-Fi coverage. As described above, the docking station 154 may include a secondary RF link interface 306 that establishes a secondary RF link 1320 with the robot 104. In the event that a primary link 1318 is unavailable, the robot 104 may maintain communication with the docking station 154 using the secondary RF link 1320. The docking station 154 may utilize one or more network interfaces 122 onboard the docking station 154 to establish communication with the network 150 or other devices. Continuing the example above, if the robot 104 finds itself in an area with inadequate Wi-Fi coverage, it may use the secondary RF link 1320 to access the docking station 154 and then access an external server 152 via the docking station 154.

In some implementations, the secondary RF link 1320 may also be used for navigational purposes. For example, the secondary RF link 1320 may be used as a beacon to provide navigational input. In another example, the secondary RF link 1320 may be used to determine a distance from the docking station 154. Continuing this example, the robot 104 may send a request to the docking station 154 which then responds within a predetermined time. Based on the value of the predetermined time and the propagation delay associated with transmission, an estimated distance between the docking station 154 and robot 104 may be determined.

The docking station 154 may provide other functions as well. For example, the docking station 154 may include additional resources such as processors, memory, and so forth that allow the docking station 154 to provide various functions such as automated speech recognition, natural language understanding, and so forth. For example, if the robot 104 is unable to contact an external server 152 to process speech acquired using a microphone 346, the audio data may be transmitted to the docking station 154 for local processing by the docking station 154. This may provide redundancy and still allow some functionality in the event that a wide area network connection, such as to the Internet, is unavailable. In some implementations, the docking station 154 may be configured to operate as an edge server to a network accessible resource, such as an external server 152.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device comprising:
a first subsystem powered by a first power source;
a second subsystem powered by a second power source separate from the first power source; and
a control circuitry coupled to the first and the second subsystems, the control circuitry operable to:
determine a first task, the first task comprising one or more of: execution of an application by the first subsystem of the autonomous mobile device that is powered by the first power source or instructions directing movement of the autonomous mobile device with the second subsystem that is powered by the second power source;
determine a first charge status indicative of power stored by the first power source of the autonomous mobile device;
determine, based on one or more of the application or the instructions directing movement of the autonomous mobile device, a classification of the first task;
determine, based on power training data and the classification of the first task, a first estimated power consumption of the execution of the application;
determine the first estimated power consumption of the application is greater than the first charge status; and
transfer power from the second power source of the autonomous mobile device to the first subsystem.

2. The autonomous mobile device of claim 1, the control circuitry operable to, prior to the transfer of power:
determine a second charge status indicative of power stored by the second power source of the autonomous mobile device;
determine a transferrable power capacity, wherein the transferrable power capacity comprises a difference between the second charge status of the second power source and a power loss transfer value indicative of loss due to one or more of voltage conversion or electrical resistance; and
determine the transferrable power capacity is greater than or equal to the first estimated power consumption.

3. The autonomous mobile device of claim 1, the control circuitry operable to, prior to the transfer of power:
use power from the first power source until a predetermined charge status at the first power source is reached;
move the autonomous mobile device using one or more motors as directed in the first task;
determine a second charge status indicative of power stored by the second power source that provides power to the one or more motors;
determine the classification based at least in part on the instructions directing movement;
determine, based on the power training data and the classification, second estimated power consumption associated with the instructions directing movement;
determine the second estimated power consumption is greater than the second charge status; and
reduce speed of movement of the autonomous mobile device.

4. The autonomous mobile device of claim 1, the control circuitry operable to:
receive data indicative of a user identifier associated with the first task; and
determine the power training data based at least in part on the user identifier, wherein the power training data comprises data indicative of historical power consumption by the autonomous mobile device responsive to previous tasks associated with the user identifier.

5. The autonomous mobile device of claim 1, the control circuitry operable to:
receive geolocation data indicative of a geolocation of the autonomous mobile device; and determine the power training data based at least in part on the geolocation data, wherein the power training data comprises data indicative of historical power consumption by the autonomous mobile device responsive to previous tasks associated with the geolocation of the autonomous mobile device.

6. The autonomous mobile device of claim 5, the control circuitry further operable to retrieve the classification from a lookup table based on one or more of the application to be executed or a speed associated with the instructions directing movement.

7. The autonomous mobile device of claim 5, the control circuitry further operable to determine actual power consumption associated with the first task and update the power training data based on the actual power consumption.

8. A device comprising:
a power management module;
a first battery connected to the power management module, wherein the first battery powers a first subsystem;
a second battery connected to the power management module, wherein the second battery powers a second subsystem;
an electrical interconnect between the first subsystem and the second subsystem that is controlled by the power management module;
a first set of one or more memories storing first computer-executable instructions;
a first set of one or more processors to execute the first computer-executable instructions to:
determine a first task to complete, the first task comprising one or more of:
execution of an application by the device or instructions directing movement of the device;
determine a first charge status indicative of power stored by the first battery;
determine, based on one or more of the application or the instructions directing movement, a classification of the first task;
determine, based on power training data and the classification of the first task, a first estimated power consumption of the first task;
determine the first estimated power consumption is greater than the first charge status; and
use the electrical interconnect to transfer power from the second battery to operate the first subsystem.

9. The device of claim 8, wherein the first subsystem comprises:
the first set of one or more memories, and
the first set of one or more processors; and
wherein the second subsystem comprises:
one or more sensors,
one or more motors,
a second set of one or more memories storing second computer-executable instructions; and
a second set of one or more processors to execute the second computer-executable instructions to:
obtain sensor data from the one or more sensors; and
operate the one or more motors to move the device responsive to the sensor data and the instructions directing movement.

10. The device of claim 8, further comprising:
the first set of one or more memories storing second computer-executable instructions; and
the first set of one or more processors to execute the second computer-executable instructions to:
prior to the transfer of power, operate the first subsystem using power from the first battery until a predetermined charge status at the first battery is reached.

11. The device of claim 8, further comprising:
the first set of one or more memories storing second computer-executable instructions; and
the first set of one or more processors to execute the second computer-executable instructions to:
determine a second charge status indicative of power stored by the second battery;
determine a transferrable power capacity, wherein the transferrable power capacity comprises a difference between the second charge status of the second battery and a power loss transfer value indicative of loss due to one or more of voltage conversion or electrical resistance; and
wherein the transfer of power is responsive to a determination that the transferrable power capacity is greater than or equal to the first estimated power consumption.

12. The device of claim 8, further comprising:
the first set of one or more memories storing second computer-executable instructions; and
the first set of one or more processors to execute the second computer-executable instructions to:
determine a second charge status indicative of power stored by a second battery that provides power to one or more motors;
determine the classification based at least in part on the instructions directing movement;
determine, based on the power training data and the classification, a second estimated power consumption associated with the instructions directing movement;
determine the second estimated power consumption is greater than the second charge status; and
reduce speed of the one or more motors.

13. The device of claim 8, further comprising:
the first set of one or more memories storing second computer-executable instructions; and
the first set of one or more processors to execute the second computer-executable instructions to:
determine a user identifier associated with the first task; and
determine the power training data based at least in part on the user identifier, wherein the power training data comprises data indicative of historical power consumption by the device responsive to previous tasks associated with the user identifier.

14. The device of claim 8, the first set of one or more processors to further execute the first computer-executable instructions to:
determine actual power consumption associated with the first task and update the power training data based on the actual power consumption.

15. The device of claim 8, further comprising:
the one or more memories storing second computer-executable instructions; and
the one or more processors to execute the second computer-executable instructions to:
access geolocation data indicative of a geolocation of the device; and
determine the power training data based at least in part on the geolocation data, wherein the power training data comprises data indicative of historical power consumption by the device responsive to previous tasks associated with the geolocation of the device.

16. The device of claim 8, further comprising:
the first set of one or more processors to execute the first computer-executable instructions to:
determine the classification of the first task by retrieval of the classification from a lookup table that is associated with the application to be executed and at a speed associated with the instructions directing movement.

17. An autonomous mobile device comprising:
a first subsystem;
a first power source associated with the first subsystem;
a second subsystem;
a second power source associated with the second subsystem; and
control circuitry coupled to the first and the second subsystems, the control circuitry operable to:
determine first data indicative of a first task to be performed by the autonomous mobile device;
determine second data indicative of power stored by the first power source;
determine, based at least in part on the first data and the second data, third data indicative of first estimated power consumption; and
based at least in part on the third data, transfer power between the first subsystem and the second subsystem.

18. The autonomous mobile device of claim 17, the control circuitry further operable to:
determine fourth data indicative of power stored by the second power source;
determine fifth data indicative of a difference between the fourth data and a power loss transfer value indicative of loss due to one or more of voltage conversion or electrical resistance; and
determine that the fifth data is greater than or equal to the first estimated power consumption.

19. The autonomous mobile device of claim 17, the control circuitry further operable to:
determine a user identifier associated with the first task; and
wherein the first data is associated with the user identifier.

20. The autonomous mobile device of claim 17, the control circuitry further operable to:
determine fourth data indicative of actual power consumption associated with the first task at a previous time; and
wherein the third data is based at least in part on the fourth data.

* * * * *

UNITED STATES PATENT AND TRADEMARK OFFICE
CERTIFICATE OF CORRECTION

PATENT NO. : 11,209,887 B1
APPLICATION NO. : 15/926288
DATED : December 28, 2021
INVENTOR(S) : Hwisung Jung Page 1 of 1

It is certified that error appears in the above-identified patent and that said Letters Patent is hereby corrected as shown below:

On the Title Page

Item (56), add:
--9,415,869 Chan et al.--.

In the Claims

Column 37, Claim 6, Line 7:
Currently reads "The autonomous mobile device of claim 5,"
Where it should read --The autonomous mobile device of claim 1,--.

Column 37, Claim 7, Line 12:
Currently reads "The autonomous mobile device of claim 5,"
Where it should read --The autonomous mobile device of claim 1,--.

Column 38, Claim 15, Lines 59-61:
Currently read "the one or more memories storing second computer-
executable instructions; and
the one or more processors to execute the second computer"
Where they should read --the first set of one or more memories storing second computer-
executable instructions; and
the first set of one or more processors to execute the second computer--.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*